(12) United States Patent
Woop et al.

(10) Patent No.: US 10,600,231 B2
(45) Date of Patent: Mar. 24, 2020

(54) COMPRESSED BOUNDING VOLUME HIERARCHY

(71) Applicant: Intel Corporation, Santa Clara, CA (US)

(72) Inventors: Sven Woop, Volklingen (DE); Carsten Benthin, Volklingen (DE); Rasmus Barringer, Helsingborg (SE); Tomas G. Akenine-Moller, Lund (SE)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/924,112

(22) Filed: Mar. 16, 2018

(65) Prior Publication Data
US 2019/0259195 A1    Aug. 22, 2019

Related U.S. Application Data

(63) Continuation of application No. 14/975,294, filed on Dec. 18, 2015, now Pat. No. 9,928,640.

(51) Int. Cl.
*G06T 15/00* (2011.01)
*G06T 15/06* (2011.01)
*G06T 15/08* (2011.01)

(52) U.S. Cl.
CPC ............ *G06T 15/06* (2013.01); *G06T 15/005* (2013.01); *G06T 15/08* (2013.01); *G06T 2210/08* (2013.01); *G06T 2210/12* (2013.01)

(58) Field of Classification Search
CPC ......... G06T 15/06; G06T 15/20; G06T 15/80; G06T 1/20; G06T 7/0081; G06T 7/0085; G06T 7/408; G06T 2200/04; G06T 2200/28; G06T 2207/20112
USPC ........................................................ 345/419
See application file for complete search history.

(56) References Cited

U.S. PATENT DOCUMENTS

| | | | |
|---|---|---|---|
| 8,922,550 B2 * | 12/2014 | Stich ....................... | G06T 15/06 345/419 |
| 9,552,664 B2 * | 1/2017 | Laine ....................... | G06T 15/10 |
| 9,928,640 B2 * | 3/2018 | Woop ....................... | G06T 15/005 |
| 10,026,214 B2 * | 7/2018 | Shin ........................ | G06T 15/06 |
| 2009/0167763 A1 | 7/2009 | Waechter et al. | |
| 2011/0050698 A1 | 3/2011 | Peterson et al. | |
| 2013/0249915 A1 | 9/2013 | Stich | |
| 2014/0333623 A1 | 11/2014 | Ozdas et al. | |
| 2015/0116325 A1 | 4/2015 | Peterson et al. | |

OTHER PUBLICATIONS

Mahovsky, J. A. "Ray tracing with reduced-precision bounding volume hierarchies." Ph.D. Thesis, (2005): pp. 1-206.*

(Continued)

*Primary Examiner* — Phu K Nguyen
(74) *Attorney, Agent, or Firm* — Womble Bond Dickinson (US) LLP

(57) ABSTRACT

Embodiments provide for a graphics processing apparatus including a graphics processing unit having bounding volume logic to operate on a compressed bounding volume hierarchy, wherein each bounding volume node stores a parent bounding volume and multiple child bounding volumes that are encoded relative to the parent bounding volume.

20 Claims, 22 Drawing Sheets

Quantized BVH Node 1610

| Parent_lower_x 1612 | Parent_lower_y 1614 | Parent_lower_z 1616 | |
|---|---|---|---|
| Parent_upper_x 1622 | Parent_upper_y 1624 | Parent_upper_z 1626 | Higher Precision (e.g., floating point) |
| Child_lower_x 1632 | Child_lower_y 1634 | Child_lower_z 1636 | Lower Precision (e.g., fixed point) |
| Child_upper_x 1642 | Child_upper_y 1644 | Child_upper_z 1646 | |
| Child Reference 1652 | | | |

(56) References Cited

OTHER PUBLICATIONS

Havran V, Herzog R, Seidel HP. On the fast construction of spatial hierarchies for ray tracing. In2006 IEEE Symposium on Interactive Ray Tracing Sep. 18, 2006 (pp. 71-80). IEEE.*

Vaidyanathan K, Akenine-Möller T, Salvi M. Watertight ray traversal with reduced precision. InHigh Performance Graphics Jun. 20, 2016 (pp. 33-40).*

Keely S. Reduced precision for hardware ray tracing in GPUs. InProceedings of High Performance Graphics Jun. 23, 2014 (pp. 29-40). Eurographics Association.*

Ernst M, Woop S. Ray tracing with shared-plane bounding volume hierarchies. Journal of Graphics, GPU, and Game Tools. Nov. 9, 2011;15(3):141-51.*

Fabianowski B, Dingliana J. Compact BVH storage for ray tracing and photon mapping. InProc. of Eurographics Ireland Workshop 2009 (pp. 1-8).*

International Search Report and Written Opinion received for PCT Patent Application No. PCT/US2016/056666, dated Jan. 20, 2017, 13 pages.

International Preliminary Report on Patentability received for PCT Patent Application No. PCT/US2016/056666 dated Jun. 28, 2018, 10 pages.

* cited by examiner

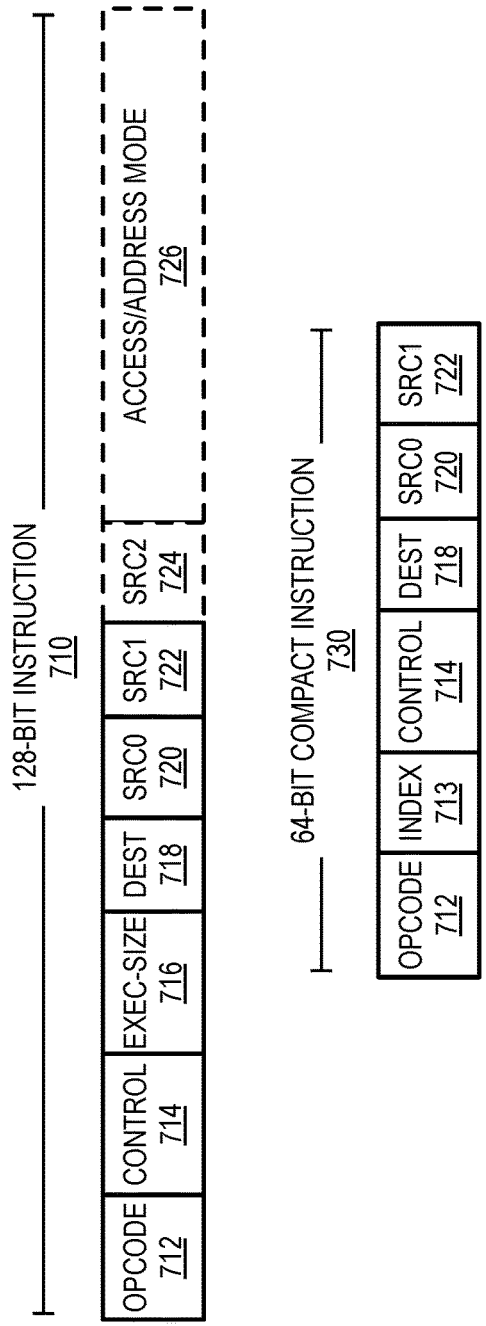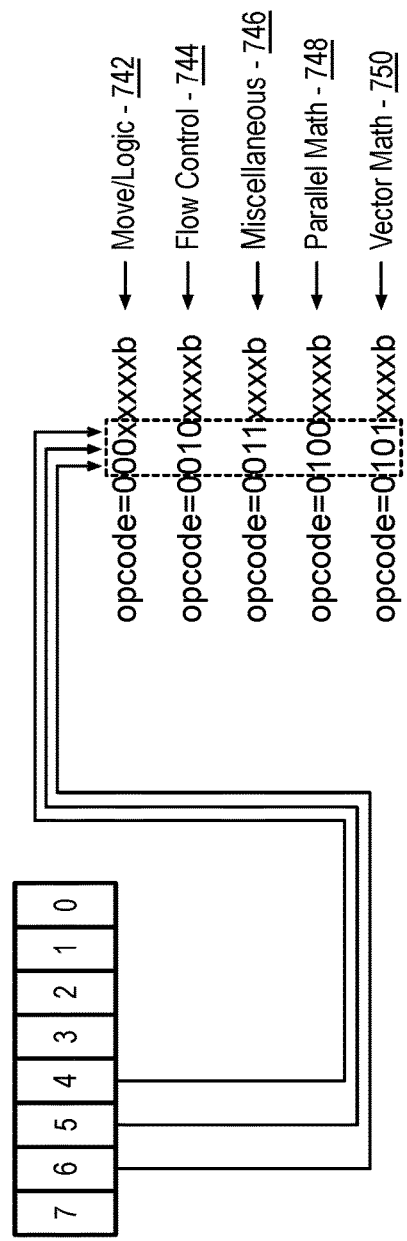
FIG. 7

FIG. 9A GRAPHICS PROCESSOR COMMAND FORMAT
900

| CLIENT 902 | OPCODE 904 | SUB-OPCODE 905 | DATA 906 | COMMAND SIZE 908 |

FIG. 9B GRAPHICS PROCESSOR COMMAND SEQUENCE
910

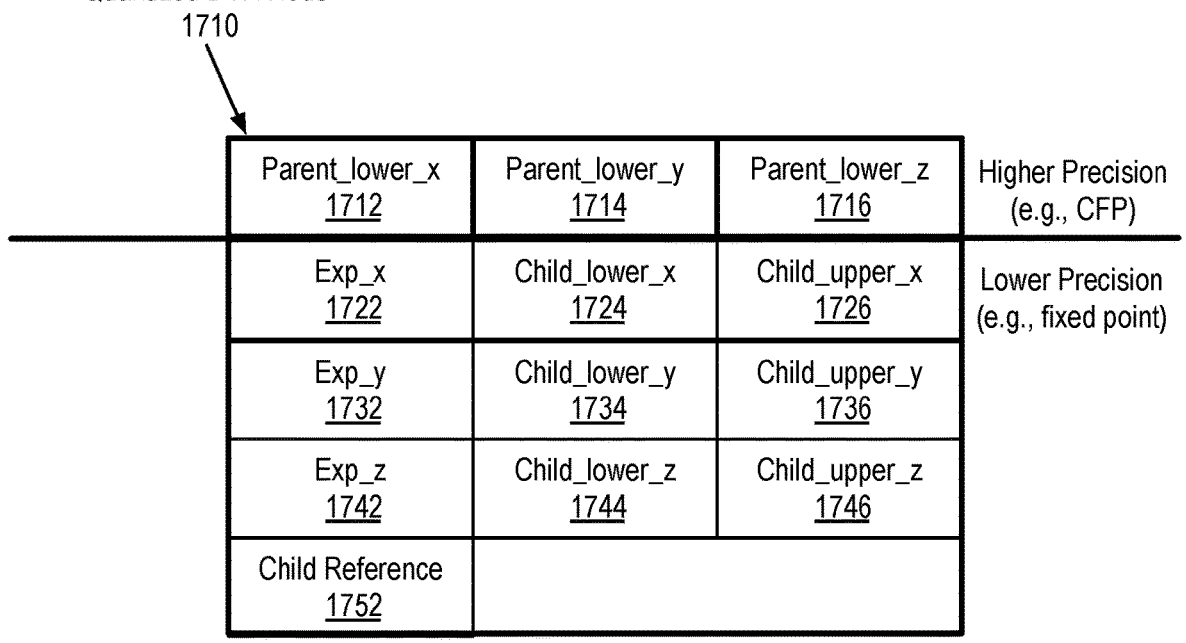
FIG. 17

COMPRESSED BOUNDING VOLUME HIERARCHY

CROSS-REFERENCE TO RELATED APPLICATIONS

This application is a continuation of U.S. patent application Ser. No. 14/975,294 filed on 18 Dec. 2015, entitled DECOMPRESSION AND TRAVERSAL OF A BOUNDING VOLUME HIERARCHY, the entire contents of which are hereby incorporated by reference.

TECHNICAL FIELD

Embodiments generally relate to graphics processing logic. More particularly, embodiments relate to graphics processing logic to perform ray tracing.

BACKGROUND

Ray tracing is a rendering algorithm that provides higher image quality than rasterization. Ray tracing is performed by tracing a path taken by light rays through pixels in an image plane. Based on the geometric objects that the ray intersects, a simulation of the effects of encounter can be generated. Each ray that is cast in a scene is tested for intersection with some subset of the objects in the scene. To determine whether a ray intersects with an object, various hierarchical techniques can be employed. For each geometric primitive in a scene, a set of bounding representations (e.g., bounding box, bounding spheres, etc.) can be organized in a hierarchical manner, such as a tree. When tracing a ray, the tree of bounding representations can be traversed to determine if the ray intersects any of the bounding nodes in the tree. For the set of nodes that are intersected, any primitives within the node can be tested for intersection.

BRIEF DESCRIPTION OF THE DRAWINGS

The various advantages of the embodiments will become apparent to one skilled in the art by reading the following specification and appended claims, and by referencing the following drawings, in which:

FIG. 7 illustrates a graphics processor execution unit instruction format according to an embodiment;

FIG. 17 is a block diagram of a composite floating point data block for use by a quantized BVH node according to a further embodiment;

DESCRIPTION OF EMBODIMENTS

Figure 1:
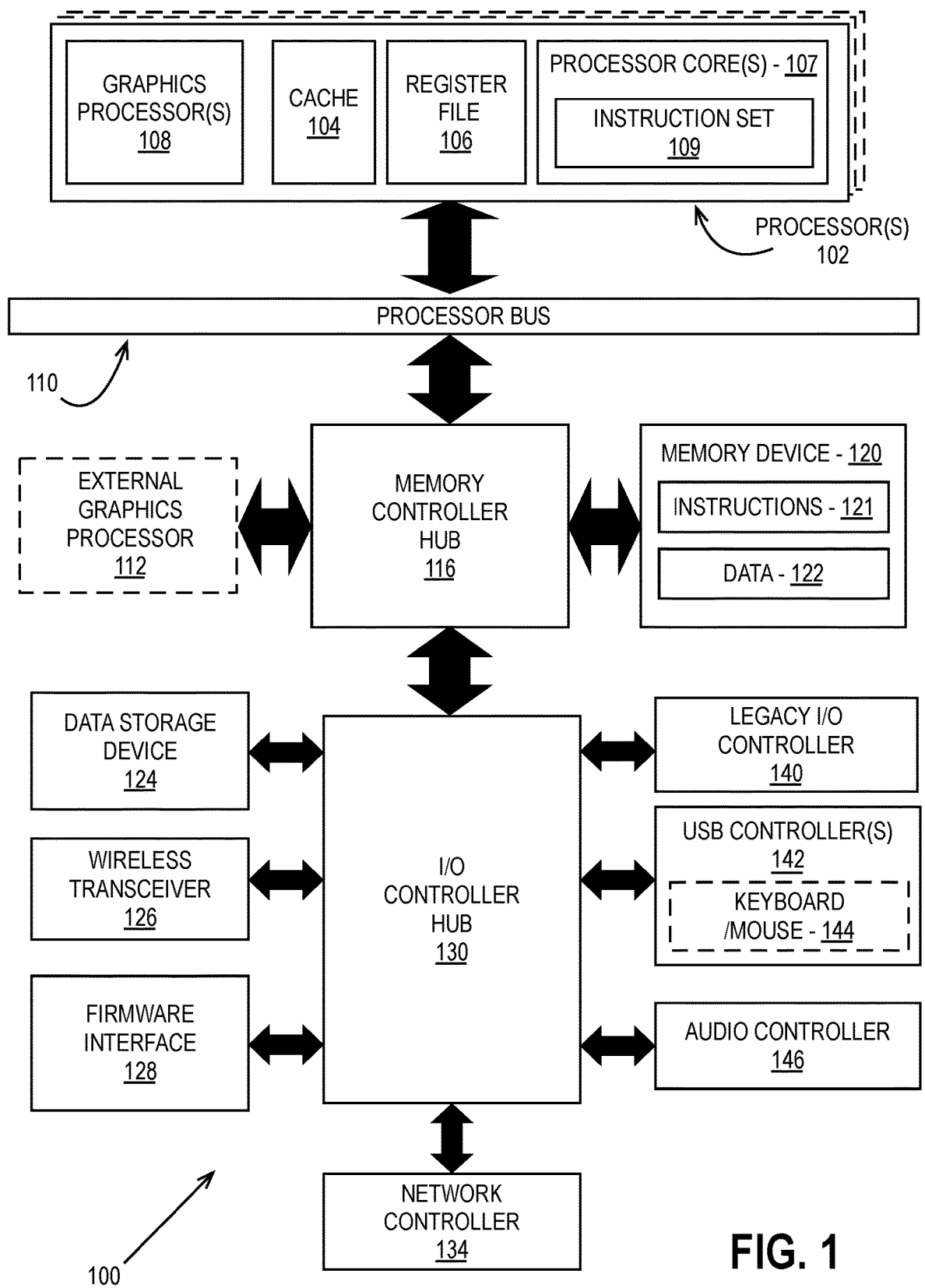
FIG. 1 is a block diagram of an embodiment of a computer system with a processor having one or more processor cores and graphics processors.

In order to perform hardware-accelerated ray tracing for a scene, a spatial acceleration data structure may be used to speed up the determination of the objects that a ray intersects within a three-dimensional scene. One of the most popular spatial acceleration data structures is the bounding volume hierarchy (BVH). The BVH forms a hierarchical search tree over the given scene primitives (e.g. triangles). Geometric objects within the scene are wrapped in bounding volumes that form the leaf nodes of the tree. The volumes that form the leaf nodes are then recursively grouped and enclosed within larger bounding volumes, resulting in a tree structure with a single bounding volume at the top of the tree. While bounding volumes are used in ray tracing, the bounding volume hierarchy has other uses in graphics processing, such as collision detection or culling.

A common issue that arises with BVH implementations is the potentially substantial memory requirements for storing BVH data. The substantial memory requirements for the BVH data introduces corresponding memory bandwidth pressure when transferring data within a BVH node to a compute unit, for example, to perform a ray-node intersection test. If the memory size requirements of a BVH node can be reduced at a fixed rate, memory space and bandwidth requirements for hardware accelerated ray tracing are also reduced.

Embodiments described herein provide for an apparatus, system, method, and various logical processes for compressing BVH nodes individually in a simple and efficient manner, without requiring a reference to the parent node or extra stack storage space to decompress the child bounds of a node, significantly reducing the complexity of implementing ray tracing acceleration hardware.

For the purposes of explanation, numerous specific details are set forth to provide a thorough understanding of the various embodiments described below. However, it will be apparent to a skilled practitioner in the art that the embodiments may be practiced without some of these specific details. In other instances, well-known structures and devices are shown in block diagram form to avoid obscuring the underlying principles, and to provide a more thorough understanding of embodiments. Although some of the following embodiments are described with reference to a graphics processor, the techniques and teachings described herein may be applied to various types of circuits or semiconductor devices, including general purpose processing devices or graphic processing devices. Reference herein to "one embodiment" or "an embodiment" indicate that a particular feature, structure, or characteristic described in connection or association with the embodiment can be included in at least one of such embodiments. However, the appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

In the description that follows, FIGS. 1-12 provide an overview of exemplary data processing system and graphics processor logic that incorporates or relates to the various embodiments. FIGS. 13-22 provide specific details of the various embodiments. Although some of the following embodiments are described with reference to a graphics processor, similar techniques and teachings can be applied to other types of circuits or semiconductor devices, as the teachings are applicable to any processor or machine that manipulates or processes image data.

System Overview

FIG. 1 is a block diagram of a processing system 100, according to an embodiment. In various embodiments the system 100 includes one or more processors 102 and one or more graphics processors 108, and may be a single processor desktop system, a multiprocessor workstation system, or a server system having a large number of processors 102 or processor cores 107. In on embodiment, the system 100 is a processing platform incorporated within a system-on-a-chip (SoC) integrated circuit for use in mobile, handheld, or embedded devices.

An embodiment of system 100 can include, or be incorporated within a server-based gaming platform, a game console, including a game and media console, a mobile gaming console, a handheld game console, or an online game console. In some embodiments system 100 is a mobile phone, smart phone, tablet computing device or mobile Internet device. Data processing system 100 can also include, couple with, or be integrated within a wearable device, such as a smart watch wearable device, smart eyewear device, augmented reality device, or virtual reality device. In some embodiments, data processing system 100 is a television or set top box device having one or more processors 102 and a graphical interface generated by one or more graphics processors 108.

In some embodiments, the one or more processors 102 each include one or more processor cores 107 to process instructions which, when executed, perform operations for system and user software. In some embodiments, each of the one or more processor cores 107 is configured to process a specific instruction set 109. In some embodiments, instruction set 109 may facilitate Complex Instruction Set Computing (CISC), Reduced Instruction Set Computing (RISC), or computing via a Very Long Instruction Word (VLIW). Multiple processor cores 107 may each process a different instruction set 109, which may include instructions to facilitate the emulation of other instruction sets. Processor core 107 may also include other processing devices, such a Digital Signal Processor (DSP).

In some embodiments, the processor 102 includes cache memory 104. Depending on the architecture, the processor 102 can have a single internal cache or multiple levels of internal cache. In some embodiments, the cache memory is shared among various components of the processor 102. In some embodiments, the processor 102 also uses an external cache (e.g., a Level-3 (L3) cache or Last Level Cache (LLC)) (not shown), which may be shared among processor cores 107 using known cache coherency techniques. A register file 106 is additionally included in processor 102 which may include different types of registers for storing different types of data (e.g., integer registers, floating point registers, status registers, and an instruction pointer register). Some registers may be general-purpose registers, while other registers may be specific to the design of the processor 102.

In some embodiments, processor 102 is coupled to a processor bus 110 to transmit communication signals such as address, data, or control signals between processor 102 and other components in system 100. In one embodiment the system 100 uses an exemplary 'hub' system architecture, including a memory controller hub 116 and an Input Output (I/O) controller hub 130. A memory controller hub 116 facilitates communication between a memory device and other components of system 100, while the I/O Controller Hub (ICH) 130 provides connections to I/O devices via a local I/O bus. In one embodiment, the logic of the memory controller hub 116 is integrated within the processor.

Memory device 120 can be a dynamic random access memory (DRAM) device, a static random access memory (SRAM) device, flash memory device, phase-change memory device, or some other memory device having suitable performance to serve as process memory. In one embodiment the memory device 120 can operate as system memory for the system 100, to store data 122 and instructions 121 for use when the one or more processors 102 executes an application or process. Memory controller hub 116 also couples with an optional external graphics processor 112, which may communicate with the one or more graphics processors 108 in processors 102 to perform graphics and media operations.

In some embodiments, ICH 130 enables peripherals to connect to memory device 120 and processor 102 via a high-speed I/O bus. The I/O peripherals include, but are not limited to, an audio controller 146, a firmware interface 128, a wireless transceiver 126 (e.g., Wi-Fi, Bluetooth), a data storage device 124 (e.g., hard disk drive, flash memory, etc.), and a legacy I/O controller 140 for coupling legacy (e.g., Personal System 2 (PS/2)) devices to the system. One or more Universal Serial Bus (USB) controllers 142 connect input devices, such as keyboard and mouse 144 combinations. A network controller 134 may also couple to ICH 130. In some embodiments, a high-performance network controller (not shown) couples to processor bus 110. It will be appreciated that the system 100 shown is exemplary and not limiting, as other types of data processing systems that are differently configured may also be used. For example, the I/O controller hub 130 may be integrated within the one or more processor 102, or the memory controller hub 116 and I/O controller hub 130 may be integrated into a discreet external graphics processor, such as the external graphics processor 112.

Figure 2:
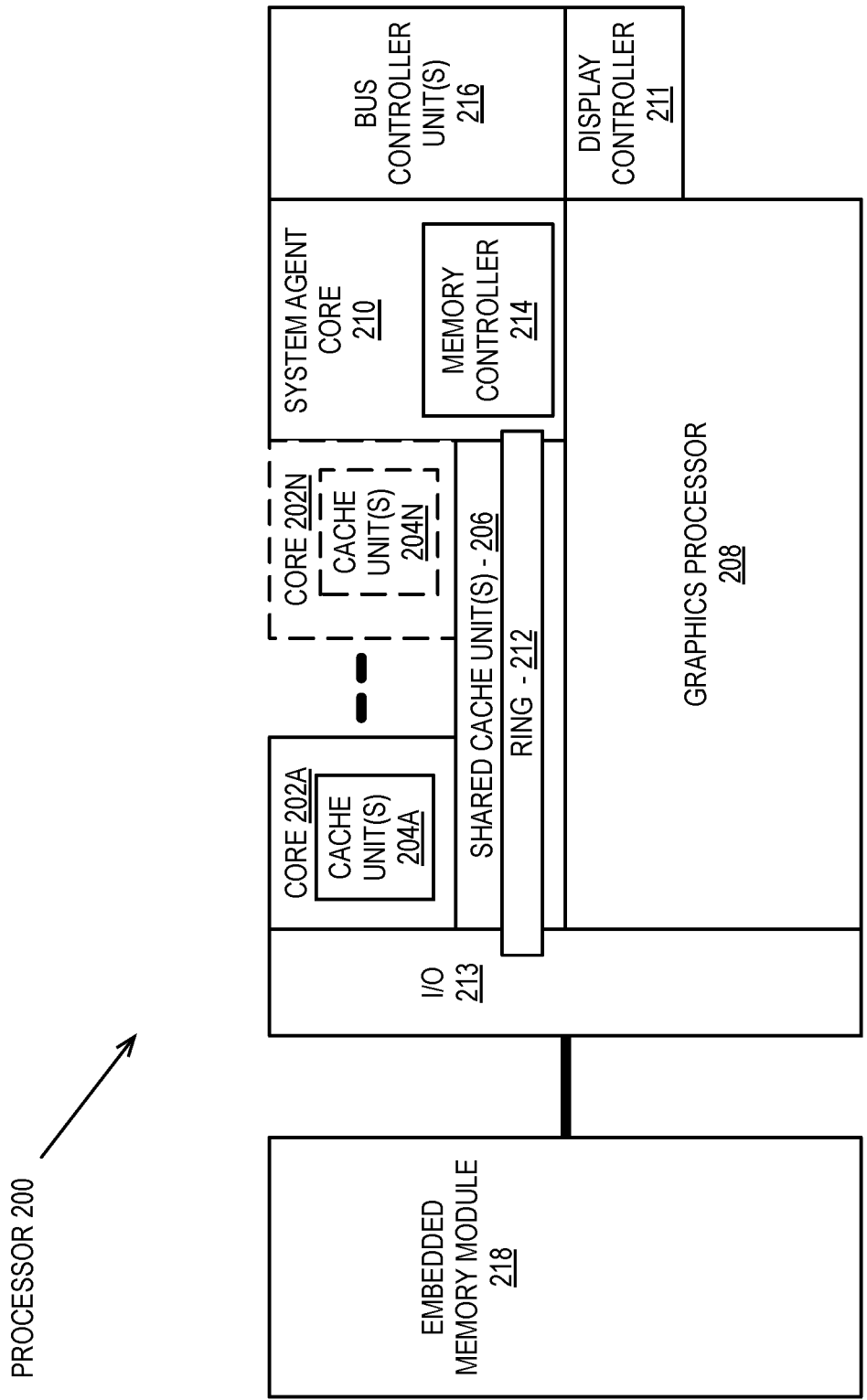
FIG. 2 is a block diagram of one embodiment of a processor having one or more processor cores, an integrated memory controller, and an integrated graphics processor.

FIG. 2 is a block diagram of an embodiment of a processor 200 having one or more processor cores 202A-202N, an integrated memory controller 214, and an integrated graphics processor 208. Those elements of FIG. 2 having the same reference numbers (or names) as the elements of any other figure herein can operate or function in any manner similar to that described elsewhere herein, but are not limited to such. Processor 200 can include additional cores up to and including additional core 202N represented by the dashed lined boxes. Each of processor cores 202A-202N includes one or more internal cache units 204A-204N. In some embodiments each processor core also has access to one or more shared cached units 206.

The internal cache units 204A-204N and shared cache units 206 represent a cache memory hierarchy within the processor 200. The cache memory hierarchy may include at least one level of instruction and data cache within each processor core and one or more levels of shared mid-level cache, such as a Level 2 (L2), Level 3 (L3), Level 4 (L4), or other levels of cache, where the highest level of cache before external memory is classified as the LLC. In some embodiments, cache coherency logic maintains coherency between the various cache units 206 and 204A-204N.

In some embodiments, processor 200 may also include a set of one or more bus controller units 216 and a system agent core 210. The one or more bus controller units 216 manage a set of peripheral buses, such as one or more Peripheral Component Interconnect buses (e.g., PCI, PCI Express). System agent core 210 provides management functionality for the various processor components. In some embodiments, system agent core 210 includes one or more integrated memory controllers 214 to manage access to various external memory devices (not shown).

In some embodiments, one or more of the processor cores 202A-202N include support for simultaneous multi-threading. In such embodiment, the system agent core 210 includes components for coordinating and operating cores 202A-202N during multi-threaded processing. System agent core 210 may additionally include a power control unit (PCU), which includes logic and components to regulate the power state of processor cores 202A-202N and graphics processor 208.

In some embodiments, processor 200 additionally includes graphics processor 208 to execute graphics processing operations. In some embodiments, the graphics processor 208 couples with the set of shared cache units 206, and the system agent core 210, including the one or more integrated memory controllers 214. In some embodiments, a display controller 211 is coupled with the graphics processor 208 to drive graphics processor output to one or more coupled displays. In some embodiments, display controller 211 may be a separate module coupled with the graphics processor via at least one interconnect, or may be integrated within the graphics processor 208 or system agent core 210.

In some embodiments, a ring based interconnect unit 212 is used to couple the internal components of the processor 200. However, an alternative interconnect unit may be used, such as a point-to-point interconnect, a switched interconnect, or other techniques, including techniques well known in the art. In some embodiments, graphics processor 208 couples with the ring interconnect 212 via an I/O link 213.

The exemplary I/O link 213 represents at least one of multiple varieties of I/O interconnects, including an on package I/O interconnect which facilitates communication between various processor components and a high-performance embedded memory module 218, such as an eDRAM module. In some embodiments, each of the processor cores 202-202N and graphics processor 208 use embedded memory modules 218 as a shared Last Level Cache.

In some embodiments, processor cores 202A-202N are homogenous cores executing the same instruction set architecture. In another embodiment, processor cores 202A-202N are heterogeneous in terms of instruction set architecture (ISA), where one or more of processor cores 202A-N execute a first instruction set, while at least one of the other cores executes a subset of the first instruction set or a different instruction set. In one embodiment processor cores 202A-202N are heterogeneous in terms of microarchitecture, where one or more cores having a relatively higher power consumption couple with one or more power cores having a lower power consumption. Additionally, processor 200 can be implemented on one or more chips or as an SoC integrated circuit having the illustrated components, in addition to other components.

Figure 3:
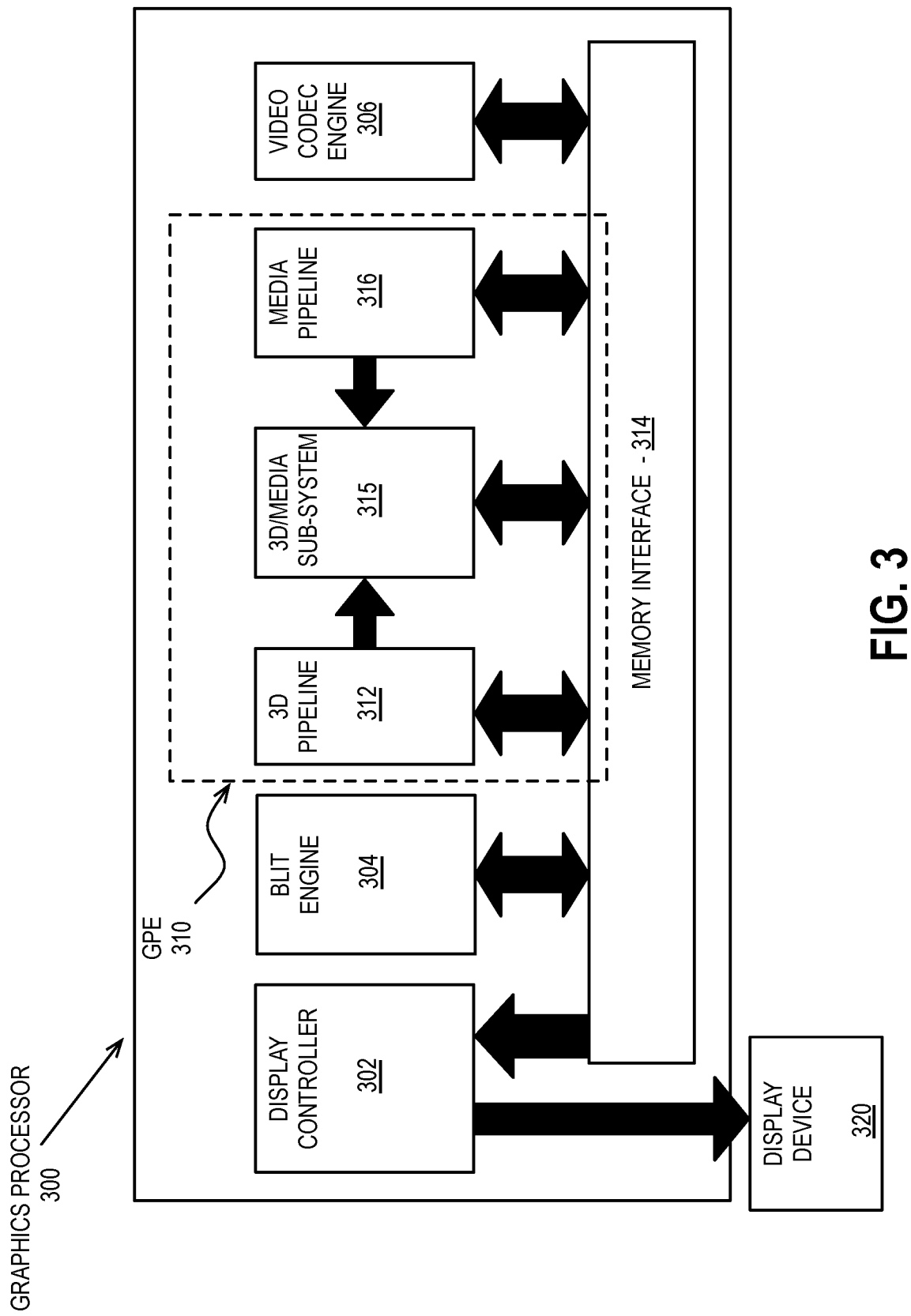
FIG. 3 is a block diagram of one embodiment of a graphics processor which may be a discreet graphics processing unit, or may be graphics processor integrated with a plurality of processing cores.

FIG. 3 is a block diagram of a graphics processor 300, which may be a discrete graphics processing unit, or may be a graphics processor integrated with a plurality of processing cores. In some embodiments, the graphics processor communicates via a memory mapped I/O interface to registers on the graphics processor and with commands placed into the processor memory. In some embodiments, graphics processor 300 includes a memory interface 314 to access memory. Memory interface 314 can be an interface to local memory, one or more internal caches, one or more shared external caches, and/or to system memory.

In some embodiments, graphics processor 300 also includes a display controller 302 to drive display output data to a display device 320. Display controller 302 includes hardware for one or more overlay planes for the display and composition of multiple layers of video or user interface elements. In some embodiments, graphics processor 300 includes a video codec engine 306 to encode, decode, or transcode media to, from, or between one or more media encoding formats, including, but not limited to Moving Picture Experts Group (MPEG) formats such as MPEG-2, Advanced Video Coding (AVC) formats such as H.264/MPEG-4 AVC, as well as the Society of Motion Picture & Television Engineers (SMPTE) 421M/VC-1, and Joint Photographic Experts Group (JPEG) formats such as JPEG, and Motion JPEG (MJPEG) formats.

In some embodiments, graphics processor 300 includes a block image transfer (BLIT) engine 304 to perform two-dimensional (2D) rasterizer operations including, for example, bit-boundary block transfers. However, in one embodiment, 2D graphics operations are performed using one or more components of graphics processing engine (GPE) 310. In some embodiments, graphics processing engine 310 is a compute engine for performing graphics operations, including three-dimensional (3D) graphics operations and media operations.

In some embodiments, GPE 310 includes a 3D pipeline 312 for performing 3D operations, such as rendering three-dimensional images and scenes using processing functions that act upon 3D primitive shapes (e.g., rectangle, triangle, etc.). The 3D pipeline 312 includes programmable and fixed function elements that perform various tasks within the element and/or spawn execution threads to a 3D/Media sub-system 315. While 3D pipeline 312 can be used to perform media operations, an embodiment of GPE 310 also includes a media pipeline 316 that is specifically used to perform media operations, such as video post-processing and image enhancement.

In some embodiments, media pipeline 316 includes fixed function or programmable logic units to perform one or more specialized media operations, such as video decode acceleration, video de-interlacing, and video encode acceleration in place of, or on behalf of video codec engine 306. In some embodiments, media pipeline 316 additionally includes a thread spawning unit to spawn threads for execution on 3D/Media sub-system 315. The spawned threads perform computations for the media operations on one or more graphics execution units included in 3D/Media subsystem 315.

In some embodiments, 3D/Media subsystem 315 includes logic for executing threads spawned by 3D pipeline 312 and media pipeline 316. In one embodiment, the pipelines send thread execution requests to 3D/Media subsystem 315, which includes thread dispatch logic for arbitrating and dispatching the various requests to available thread execution resources. The execution resources include an array of graphics execution units to process the 3D and media threads. In some embodiments, 3D/Media subsystem 315 includes one or more internal caches for thread instructions and data. In some embodiments, the subsystem also includes shared memory, including registers and addressable memory, to share data between threads and to store output data.

3D/Media Processing

Figure 4:
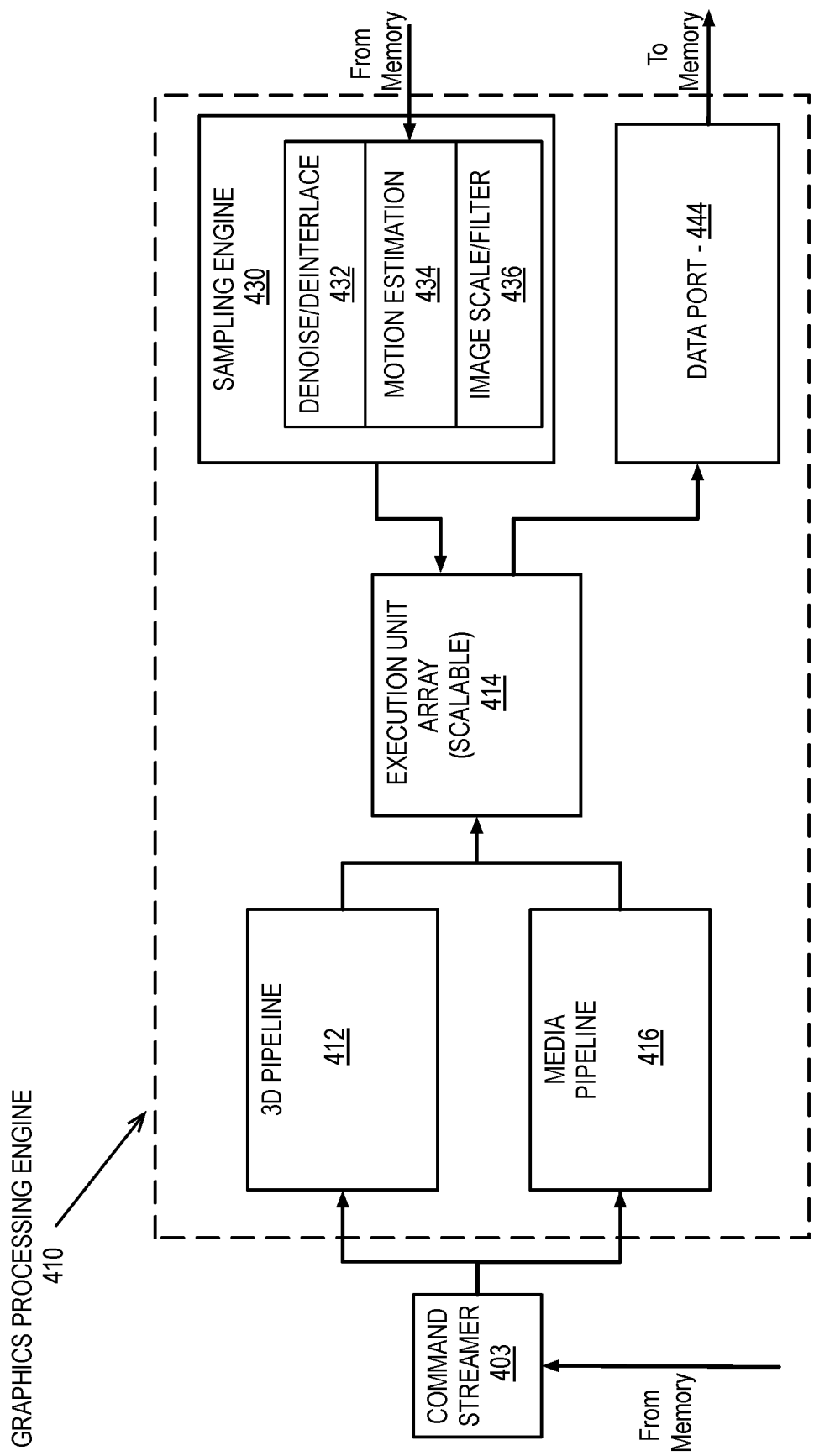
FIG. 4 is a block diagram of an embodiment of a graphics processing engine for a graphics processor.

FIG. 4 is a block diagram of a graphics processing engine 410 of a graphics processor in accordance with some embodiments. In one embodiment, the GPE 410 is a version of the GPE 310 shown in FIG. 3. Elements of FIG. 4 having the same reference numbers (or names) as the elements of any other figure herein can operate or function in any manner similar to that described elsewhere herein, but are not limited to such.

In some embodiments, GPE 410 couples with a command streamer 403, which provides a command stream to the GPE 3D and media pipelines 412, 416. In some embodiments, command streamer 403 is coupled to memory, which can be system memory, or one or more of internal cache memory and shared cache memory. In some embodiments, command streamer 403 receives commands from the memory and sends the commands to 3D pipeline 412 and/or media pipeline 416. The commands are directives fetched from a ring buffer, which stores commands for the 3D and media pipelines 412, 416. In one embodiment, the ring buffer can additionally include batch command buffers storing batches of multiple commands. The 3D and media pipelines 412, 416 process the commands by performing operations via logic within the respective pipelines or by dispatching one or more execution threads to an execution unit array 414. In some embodiments, execution unit array 414 is scalable, such that the array includes a variable number of execution units based on the target power and performance level of GPE 410.

In some embodiments, a sampling engine 430 couples with memory (e.g., cache memory or system memory) and execution unit array 414. In some embodiments, sampling engine 430 provides a memory access mechanism for execution unit array 414 that allows execution array 414 to read graphics and media data from memory. In some embodiments, sampling engine 430 includes logic to perform specialized image sampling operations for media.

In some embodiments, the specialized media sampling logic in sampling engine 430 includes a de-noise/de-interlace module 432, a motion estimation module 434, and an image scaling and filtering module 436. In some embodiments, de-noise/de-interlace module 432 includes logic to perform one or more of a de-noise or a de-interlace algorithm on decoded video data. The de-interlace logic combines alternating fields of interlaced video content into a single fame of video. The de-noise logic reduces or removes data noise from video and image data. In some embodiments, the de-noise logic and de-interlace logic are motion adaptive and use spatial or temporal filtering based on the amount of motion detected in the video data. In some embodiments, the de-noise/de-interlace module 432 includes dedicated motion detection logic (e.g., within the motion estimation engine 434).

In some embodiments, motion estimation engine 434 provides hardware acceleration for video operations by performing video acceleration functions such as motion vector estimation and prediction on video data. The motion estimation engine determines motion vectors that describe the transformation of image data between successive video frames. In some embodiments, a graphics processor media codec uses video motion estimation engine 434 to perform operations on video at the macro-block level that may otherwise be too computationally intensive to perform with a general-purpose processor. In some embodiments, motion estimation engine 434 is generally available to graphics processor components to assist with video decode and processing functions that are sensitive or adaptive to the direction or magnitude of the motion within video data.

In some embodiments, image scaling and filtering module 436 performs image-processing operations to enhance the visual quality of generated images and video. In some embodiments, scaling and filtering module 436 processes image and video data during the sampling operation before providing the data to execution unit array 414.

In some embodiments, the GPE 410 includes a data port 444, which provides an additional mechanism for graphics subsystems to access memory. In some embodiments, data port 444 facilitates memory access for operations including render target writes, constant buffer reads, scratch memory space reads/writes, and media surface accesses. In some embodiments, data port 444 includes cache memory space to cache accesses to memory. The cache memory can be a single data cache or separated into multiple caches for the multiple subsystems that access memory via the data port (e.g., a render buffer cache, a constant buffer cache, etc.). In some embodiments, threads executing on an execution unit in execution unit array 414 communicate with the data port by exchanging messages via a data distribution interconnect that couples each of the sub-systems of GPE 410.

Execution Units

Figure 5:
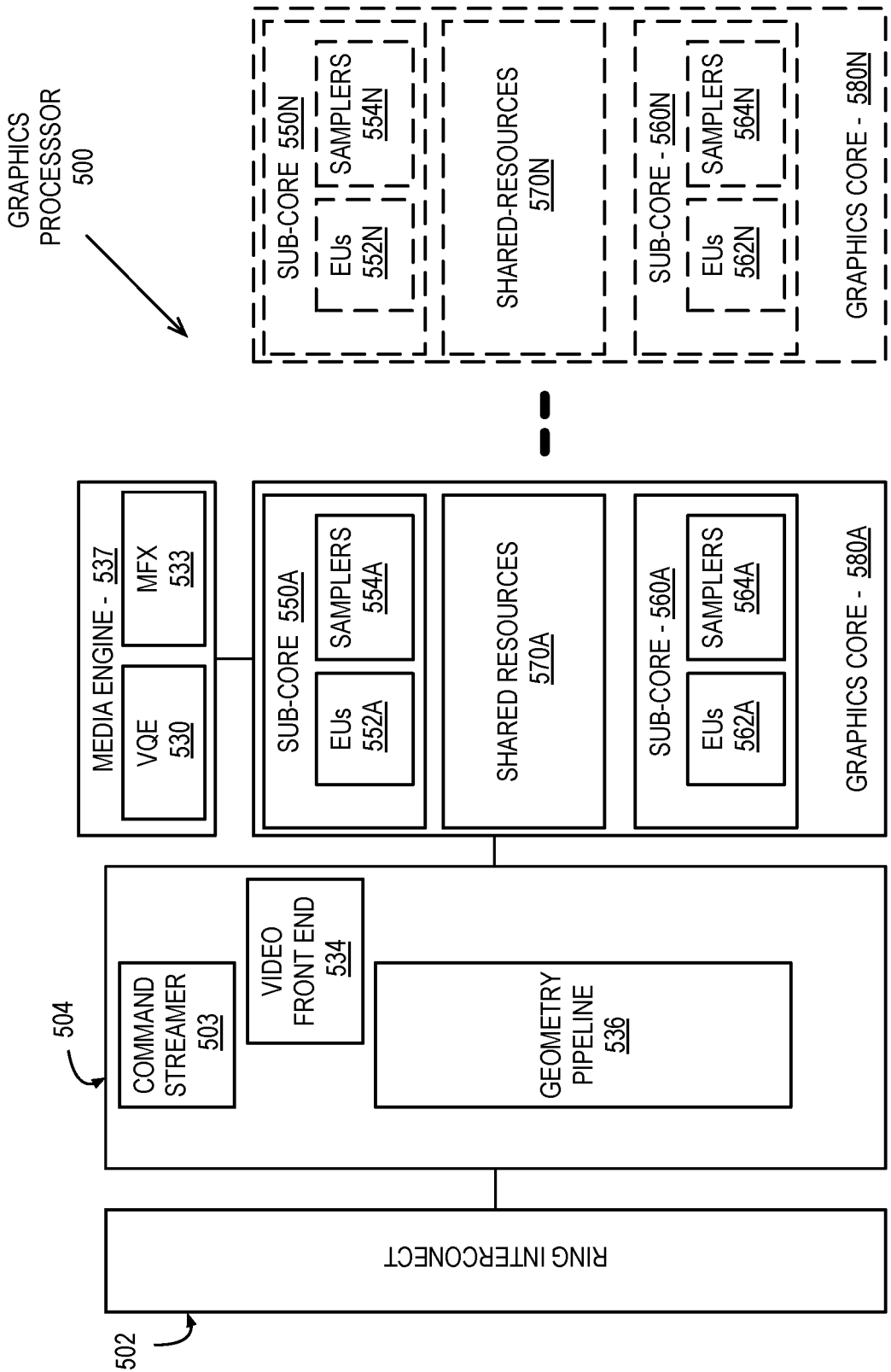
FIG. 5 is a block diagram of another embodiment of a graphics processor.

FIG. 5 is a block diagram of another embodiment of a graphics processor 500. Elements of FIG. 5 having the same reference numbers (or names) as the elements of any other figure herein can operate or function in any manner similar to that described elsewhere herein, but are not limited to such.

In some embodiments, graphics processor 500 includes a ring interconnect 502, a pipeline front-end 504, a media engine 537, and graphics cores 580A-580N. In some embodiments, ring interconnect 502 couples the graphics processor to other processing units, including other graphics processors or one or more general-purpose processor cores. In some embodiments, the graphics processor is one of many processors integrated within a multi-core processing system.

In some embodiments, graphics processor 500 receives batches of commands via ring interconnect 502. The incoming commands are interpreted by a command streamer 503 in the pipeline front-end 504. In some embodiments, graphics processor 500 includes scalable execution logic to perform 3D geometry processing and media processing via the graphics core(s) 580A-580N. For 3D geometry processing commands, command streamer 503 supplies commands to geometry pipeline 536. For at least some media processing commands, command streamer 503 supplies the commands to a video front end 534, which couples with a media engine 537. In some embodiments, media engine 537 includes a Video Quality Engine (VQE) 530 for video and image post-processing and a multi-format encode/decode (MFX) 533 engine to provide hardware-accelerated media data encode and decode. In some embodiments, geometry pipeline 536 and media engine 537 each generate execution threads for the thread execution resources provided by at least one graphics core 580A.

In some embodiments, graphics processor 500 includes scalable thread execution resources featuring modular cores 580A-580N (sometimes referred to as core slices), each having multiple sub-cores 550A-550N, 560A-560N (sometimes referred to as core sub-slices). In some embodiments, graphics processor 500 can have any number of graphics cores 580A through 580N. In some embodiments, graphics processor 500 includes a graphics core 580A having at least a first sub-core 550A and a second core sub-core 560A. In other embodiments, the graphics processor is a low power processor with a single sub-core (e.g., 550A). In some embodiments, graphics processor 500 includes multiple graphics cores 580A-580N, each including a set of first sub-cores 550A-550N and a set of second sub-cores 560A-560N. Each sub-core in the set of first sub-cores 550A-550N includes at least a first set of execution units 552A-552N and media/texture samplers 554A-554N. Each sub-core in the set of second sub-cores 560A-560N includes at least a second set of execution units 562A-562N and samplers 564A-564N. In some embodiments, each sub-core 550A-550N, 560A-560N shares a set of shared resources 570A-570N. In some embodiments, the shared resources include shared cache memory and pixel operation logic. Other shared resources may also be included in the various embodiments of the graphics processor.

Figure 6:
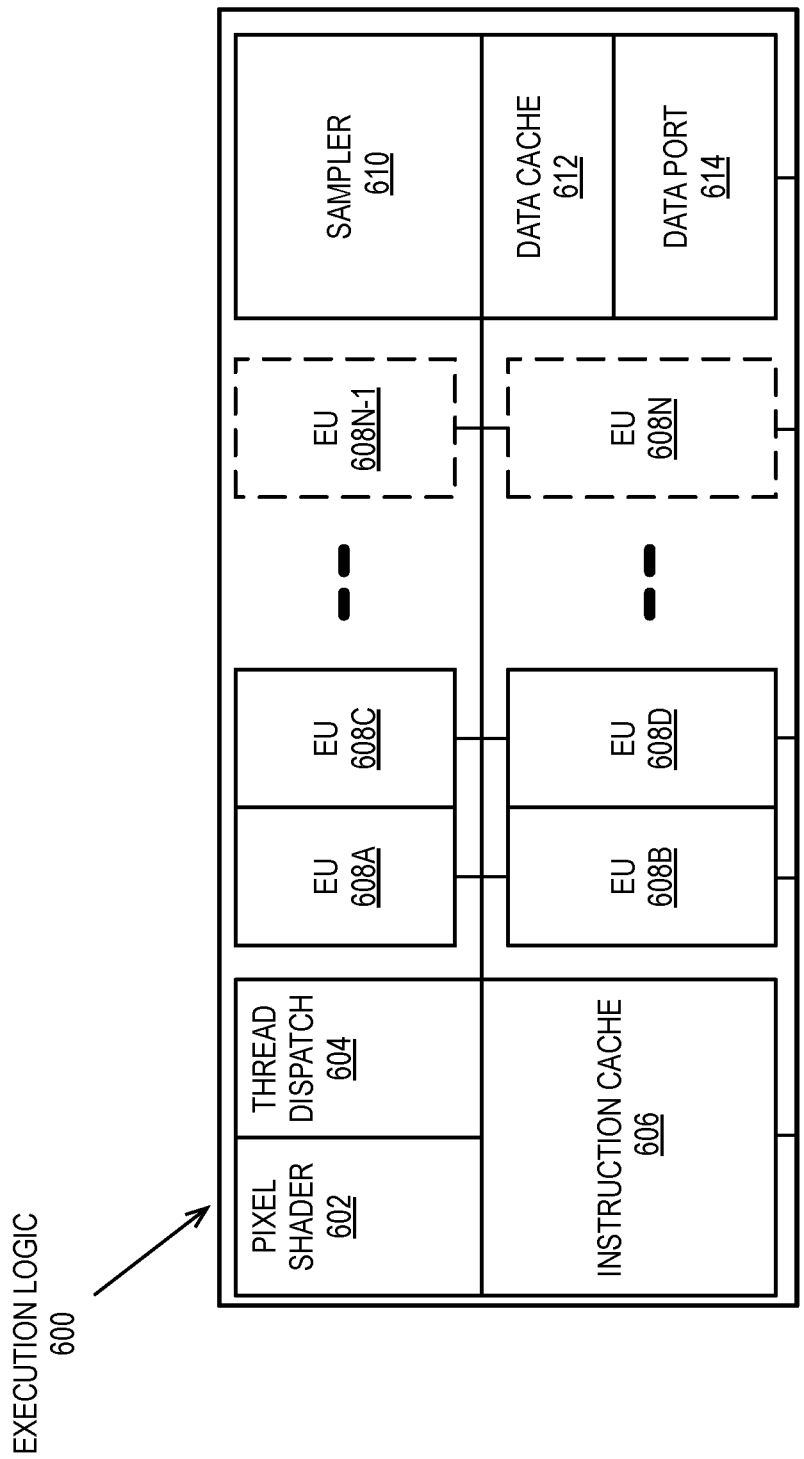
FIG. 6 is a block diagram of thread execution logic including an array of processing elements.

FIG. 6 illustrates thread execution logic 600 including an array of processing elements employed in some embodiments of a GPE. Elements of FIG. 6 having the same reference numbers (or names) as the elements of any other figure herein can operate or function in any manner similar to that described elsewhere herein, but are not limited to such.

In some embodiments, thread execution logic 600 includes a pixel shader 602, a thread dispatcher 604, instruction cache 606, a scalable execution unit array including a plurality of execution units 608A-608N, a sampler 610, a data cache 612, and a data port 614. In one embodiment the included components are interconnected via an interconnect fabric that links to each of the components. In some embodiments, thread execution logic 600 includes one or more connections to memory, such as system memory or cache memory, through one or more of instruction cache 606, data port 614, sampler 610, and execution unit array 608A-608N. In some embodiments, each execution unit (e.g. 608A) is an individual vector processor capable of executing multiple simultaneous threads and processing multiple data elements in parallel for each thread. In some embodiments, execution unit array 608A-608N includes any number individual execution units.

In some embodiments, execution unit array 608A-608N is primarily used to execute "shader" programs. In some embodiments, the execution units in array 608A-608N execute an instruction set that includes native support for many standard 3D graphics shader instructions, such that shader programs from graphics libraries (e.g., Direct 3D and OpenGL) are executed with a minimal translation. The execution units support vertex and geometry processing (e.g., vertex programs, geometry programs, vertex shaders), pixel processing (e.g., pixel shaders, fragment shaders) and general-purpose processing (e.g., compute and media shaders).

Each execution unit in execution unit array 608A-608N operates on arrays of data elements. The number of data elements is the "execution size," or the number of channels for the instruction. An execution channel is a logical unit of execution for data element access, masking, and flow control within instructions. The number of channels may be independent of the number of physical Arithmetic Logic Units (ALUs) or Floating Point Units (FPUs) for a particular graphics processor. In some embodiments, execution units 608A-608N support integer and floating-point data types.

The execution unit instruction set includes single instruction multiple data (SIMD) instructions. The various data elements can be stored as a packed data type in a register and the execution unit will process the various elements based on the data size of the elements. For example, when operating on a 256-bit wide vector, the 256 bits of the vector are stored in a register and the execution unit operates on the vector as four separate 64-bit packed data elements (Quad-Word (QW) size data elements), eight separate 32-bit packed data elements (Double Word (DW) size data elements), sixteen separate 16-bit packed data elements (Word (W) size data elements), or thirty-two separate 8-bit data elements (byte (B) size data elements). However, different vector widths and register sizes are possible.

One or more internal instruction caches (e.g., 606) are included in the thread execution logic 600 to cache thread instructions for the execution units. In some embodiments, one or more data caches (e.g., 612) are included to cache thread data during thread execution. In some embodiments, sampler 610 is included to provide texture sampling for 3D operations and media sampling for media operations. In some embodiments, sampler 610 includes specialized texture or media sampling functionality to process texture or media data during the sampling process before providing the sampled data to an execution unit.

During execution, the graphics and media pipelines send thread initiation requests to thread execution logic 600 via thread spawning and dispatch logic. In some embodiments, thread execution logic 600 includes a local thread dispatcher 604 that arbitrates thread initiation requests from the graphics and media pipelines and instantiates the requested threads on one or more execution units 608A-608N. For example, the geometry pipeline (e.g., 536 of FIG. 5) dispatches vertex processing, tessellation, or geometry processing threads to thread execution logic 600 (FIG. 6). In some embodiments, thread dispatcher 604 can also process runtime thread spawning requests from the executing shader programs.

Once a group of geometric objects has been processed and rasterized into pixel data, pixel shader 602 is invoked to further compute output information and cause results to be written to output surfaces (e.g., color buffers, depth buffers, stencil buffers, etc.). In some embodiments, pixel shader 602 calculates the values of the various vertex attributes that are to be interpolated across the rasterized object. In some embodiments, pixel shader 602 then executes an application programming interface (API)-supplied pixel shader program. To execute the pixel shader program, pixel shader 602 dispatches threads to an execution unit (e.g., 608A) via thread dispatcher 604. In some embodiments, pixel shader 602 uses texture sampling logic in sampler 610 to access texture data in texture maps stored in memory. Arithmetic operations on the texture data and the input geometry data compute pixel color data for each geometric fragment, or discards one or more pixels from further processing.

In some embodiments, the data port 614 provides a memory access mechanism for the thread execution logic 600 output processed data to memory for processing on a graphics processor output pipeline. In some embodiments, the data port 614 includes or couples to one or more cache memories (e.g., data cache 612) to cache data for memory access via the data port.

FIG. 7 is a block diagram illustrating a graphics processor instruction formats 700 according to some embodiments. In one or more embodiment, the graphics processor execution units support an instruction set having instructions in multiple formats. The solid lined boxes illustrate the components that are generally included in an execution unit instruction, while the dashed lines include components that are optional or that are only included in a sub-set of the instructions. In some embodiments, instruction format 700 described and illustrated are macro-instructions, in that they are instructions supplied to the execution unit, as opposed to micro-operations resulting from instruction decode once the instruction is processed.

In some embodiments, the graphics processor execution units natively support instructions in a 128-bit format 710. A 64-bit compacted instruction format 730 is available for some instructions based on the selected instruction, instruction options, and number of operands. The native 128-bit format 710 provides access to all instruction options, while some options and operations are restricted in the 64-bit format 730. The native instructions available in the 64-bit format 730 vary by embodiment. In some embodiments, the instruction is compacted in part using a set of index values in an index field 713. The execution unit hardware references a set of compaction tables based on the index values and uses the compaction table outputs to reconstruct a native instruction in the 128-bit format 710.

For each format, instruction opcode 712 defines the operation that the execution unit is to perform. The execution units execute each instruction in parallel across the multiple data elements of each operand. For example, in response to an add instruction the execution unit performs a simultaneous add operation across each color channel representing a texture element or picture element. By default, the execution unit performs each instruction across all data channels of the operands. In some embodiments, instruction control field 714 enables control over certain execution options, such as channels selection (e.g., predication) and data channel order (e.g., swizzle). For 128-bit instructions 710 an exec-size field 716 limits the number of data channels that will be executed in parallel. In some embodiments, exec-size field 716 is not available for use in the 64-bit compact instruction format 730.

Some execution unit instructions have up to three operands including two source operands, src0 720, src1 722, and one destination 718. In some embodiments, the execution units support dual destination instructions, where one of the destinations is implied. Data manipulation instructions can have a third source operand (e.g., SRC2 724), where the instruction opcode 712 determines the number of source operands. An instruction's last source operand can be an immediate (e.g., hard-coded) value passed with the instruction.

In some embodiments, the 128-bit instruction format 710 includes an access/address mode information 726 specifying, for example, whether direct register addressing mode or indirect register addressing mode is used. When direct register addressing mode is used, the register address of one or more operands is directly provided by bits in the instruction 710.

In some embodiments, the 128-bit instruction format 710 includes an access/address mode field 726, which specifies an address mode and/or an access mode for the instruction. In one embodiment the access mode to define a data access alignment for the instruction. Some embodiments support access modes including a 16-byte aligned access mode and a 1-byte aligned access mode, where the byte alignment of the access mode determines the access alignment of the instruction operands. For example, when in a first mode, the instruction 710 may use byte-aligned addressing for source and destination operands and when in a second mode, the instruction 710 may use 16-byte-aligned addressing for all source and destination operands.

In one embodiment, the address mode portion of the access/address mode field 726 determines whether the instruction is to use direct or indirect addressing. When direct register addressing mode is used bits in the instruction 710 directly provide the register address of one or more operands. When indirect register addressing mode is used, the register address of one or more operands may be computed based on an address register value and an address immediate field in the instruction.

In some embodiments instructions are grouped based on opcode 712 bit-fields to simplify Opcode decode 740. For an 8-bit opcode, bits 4, 5, and 6 allow the execution unit to determine the type of opcode. The precise opcode grouping shown is merely an example. In some embodiments, a move and logic opcode group 742 includes data movement and logic instructions (e.g., move (mov), compare (cmp)). In some embodiments, move and logic group 742 shares the five most significant bits (MSB), where move (mov) instructions are in the form of 0000xxxxb and logic instructions are in the form of 0001xxxxb. A flow control instruction group 744 (e.g., call, jump (jmp)) includes instructions in the form of 0010xxxxb (e.g., 0x20). A miscellaneous instruction group 746 includes a mix of instructions, including synchronization instructions (e.g., wait, send) in the form of 0011xxxxb (e.g., 0x30). A parallel math instruction group 748 includes component-wise arithmetic instructions (e.g., add, multiply (mul)) in the form of 0100xxxxb (e.g., 0x40). The parallel math group 748 performs the arithmetic operations in parallel across data channels. The vector math group 750 includes arithmetic instructions (e.g., dp4) in the form of 0101xxxxb (e.g., 0x50). The vector math group performs arithmetic such as dot product calculations on vector operands.

Graphics Pipeline

Figure 8:
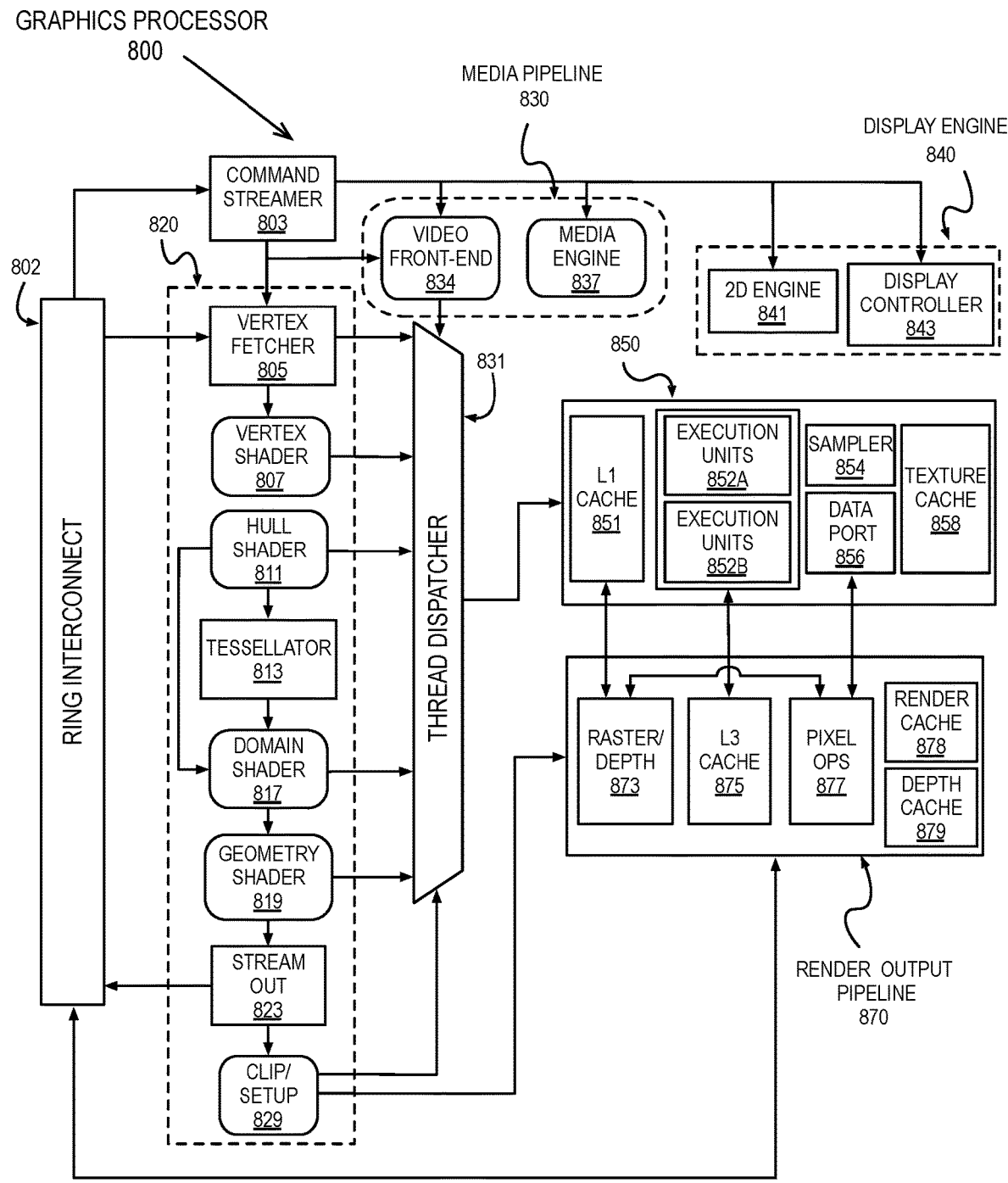
FIG. 8 is a block diagram of another embodiment of a graphics processor which includes a graphics pipeline, a media pipeline, a display engine, thread execution logic, and a render output pipeline.
Figure 9:
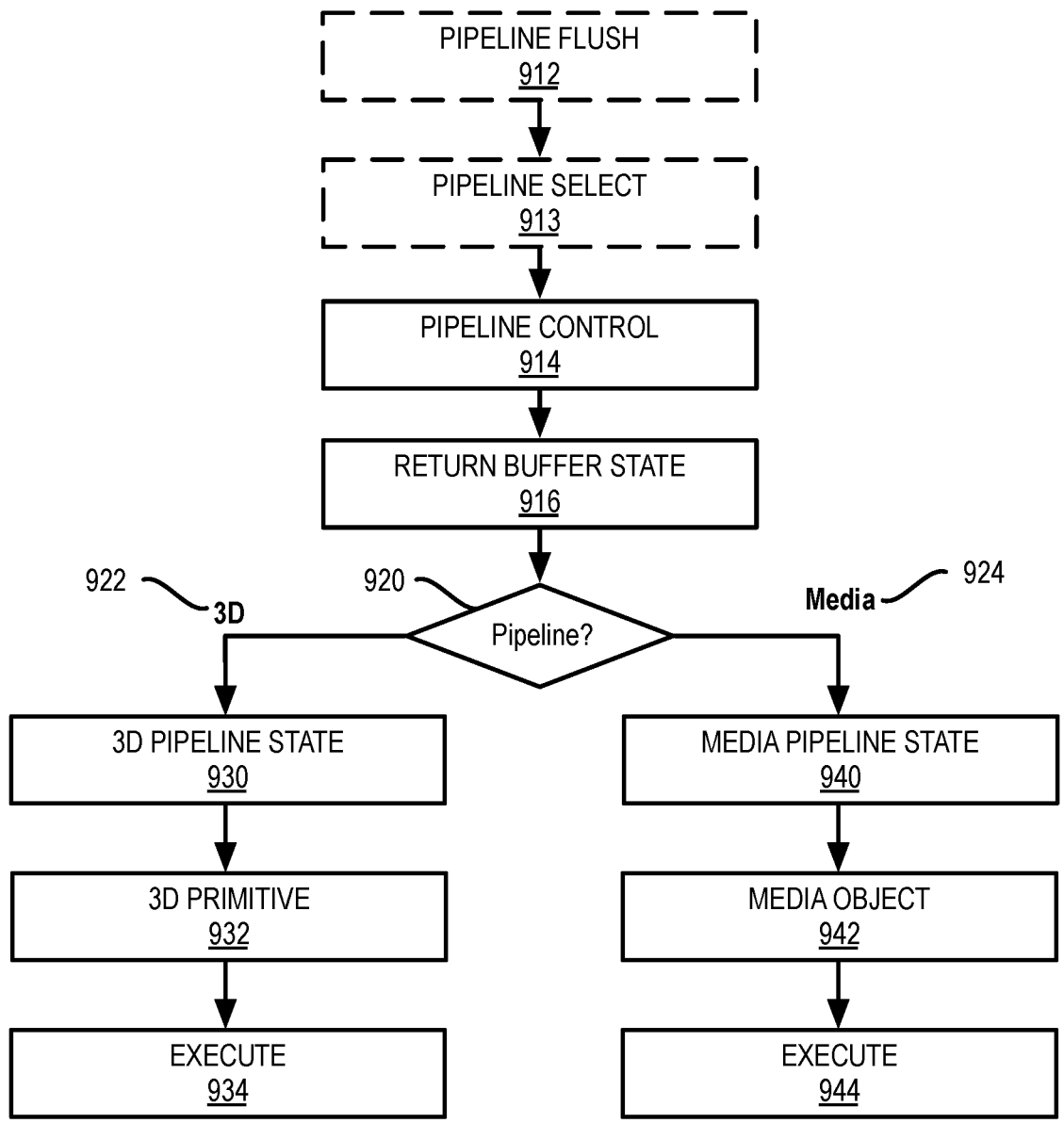
FIG. 9A is a block diagram illustrating a graphics processor command format according to an embodiment.
FIG. 9B is a block diagram illustrating a graphics processor command sequence according to an embodiment.

FIG. 8 is a block diagram of another embodiment of a graphics processor 800. Elements of FIG. 8 having the same reference numbers (or names) as the elements of any other figure herein can operate or function in any manner similar to that described elsewhere herein, but are not limited to such.

In some embodiments, graphics processor 800 includes a graphics pipeline 820, a media pipeline 830, a display engine 840, thread execution logic 850, and a render output pipeline 870. In some embodiments, graphics processor 800 is a graphics processor within a multi-core processing system that includes one or more general-purpose processing cores. The graphics processor is controlled by register writes to one or more control registers (not shown) or via commands issued to graphics processor 800 via a ring interconnect 802. In some embodiments, ring interconnect 802 couples graphics processor 800 to other processing components, such as other graphics processors or general-purpose processors. Commands from ring interconnect 802 are interpreted by a command streamer 803, which supplies instructions to individual components of graphics pipeline 820 or media pipeline 830.

In some embodiments, command streamer 803 directs the operation of a vertex fetcher 805 that reads vertex data from memory and executes vertex-processing commands provided by command streamer 803. In some embodiments, vertex fetcher 805 provides vertex data to a vertex shader 807, which performs coordinate space transformation and lighting operations to each vertex. In some embodiments, vertex fetcher 805 and vertex shader 807 execute vertex-processing instructions by dispatching execution threads to execution units 852A, 852B via a thread dispatcher 831.

In some embodiments, execution units 852A, 852B are an array of vector processors having an instruction set for performing graphics and media operations. In some embodiments, execution units 852A, 852B have an attached L1 cache 851 that is specific for each array or shared between the arrays. The cache can be configured as a data cache, an instruction cache, or a single cache that is partitioned to contain data and instructions in different partitions.

In some embodiments, graphics pipeline 820 includes tessellation components to perform hardware-accelerated tessellation of 3D objects. In some embodiments, a programmable hull shader 811 configures the tessellation operations. A programmable domain shader 817 provides back-end evaluation of tessellation output. A tessellator 813 operates at the direction of hull shader 811 and contains special purpose logic to generate a set of detailed geometric objects based on a coarse geometric model that is provided as input to graphics pipeline 820. In some embodiments, if tessellation is not used, tessellation components 811, 813, 817 can be bypassed.

In some embodiments, complete geometric objects can be processed by a geometry shader 819 via one or more threads dispatched to execution units 852A, 852B, or can proceed directly to the clipper 829. In some embodiments, the geometry shader operates on entire geometric objects, rather than vertices or patches of vertices as in previous stages of the graphics pipeline. If the tessellation is disabled the geometry shader 819 receives input from the vertex shader 807. In some embodiments, geometry shader 819 is programmable by a geometry shader program to perform geometry tessellation if the tessellation units are disabled.

Before rasterization, a clipper 829 processes vertex data. The clipper 829 may be a fixed function clipper or a programmable clipper having clipping and geometry shader functions. In some embodiments, a rasterizer and depth test component 873 in the render output pipeline 870 dispatches pixel shaders to convert the geometric objects into their per pixel representations. In some embodiments, pixel shader logic is included in thread execution logic 850. In some embodiments, an application can bypass the rasterizer 873 and access un-rasterized vertex data via a stream out unit 823.

The graphics processor 800 has an interconnect bus, interconnect fabric, or some other interconnect mechanism that allows data and message passing amongst the major components of the processor. In some embodiments, execution units 852A, 852B and associated cache(s) 851, texture and media sampler 854, and texture/sampler cache 858 interconnect via a data port 856 to perform memory access and communicate with render output pipeline components of the processor. In some embodiments, sampler 854, caches 851, 858 and execution units 852A, 852B each have separate memory access paths.

In some embodiments, render output pipeline 870 contains a rasterizer and depth test component 873 that converts vertex-based objects into an associated pixel-based representation. In some embodiments, the render output pipeline 870 includes a windower/masker unit to perform fixed function triangle and line rasterization. An associated render cache 878 and depth cache 879 are also available in some embodiments. A pixel operations component 877 performs pixel-based operations on the data, though in some instances, pixel operations associated with 2D operations (e.g. bit block image transfers with blending) are performed by the 2D engine 841, or substituted at display time by the display controller 843 using overlay display planes. In some embodiments, a shared L3 cache 875 is available to all graphics components, allowing the sharing of data without the use of main system memory.

In some embodiments, graphics processor media pipeline 830 includes a media engine 837 and a video front end 834. In some embodiments, video front end 834 receives pipeline commands from the command streamer 803. In some embodiments, media pipeline 830 includes a separate command streamer. In some embodiments, video front-end 834 processes media commands before sending the command to the media engine 837. In some embodiments, media engine 837 includes thread spawning functionality to spawn threads for dispatch to thread execution logic 850 via thread dispatcher 831.

In some embodiments, graphics processor 800 includes a display engine 840. In some embodiments, display engine 840 is external to processor 800 and couples with the graphics processor via the ring interconnect 802, or some other interconnect bus or fabric. In some embodiments, display engine 840 includes a 2D engine 841 and a display controller 843. In some embodiments, display engine 840 contains special purpose logic capable of operating independently of the 3D pipeline. In some embodiments, display controller 843 couples with a display device (not shown), which may be a system integrated display device, as in a laptop computer, or an external display device attached via a display device connector.

In some embodiments, graphics pipeline 820 and media pipeline 830 are configurable to perform operations based on multiple graphics and media programming interfaces and are not specific to any one application programming interface (API). In some embodiments, driver software for the graphics processor translates API calls that are specific to a particular graphics or media library into commands that can be processed by the graphics processor. In some embodiments, support is provided for the Open Graphics Library (OpenGL) and Open Computing Language (OpenCL) from the Khronos Group, the Direct3D library from the Microsoft Corporation, or support may be provided to both OpenGL and D3D. Support may also be provided for the Open Source Computer Vision Library (OpenCV). A future API with a compatible 3D pipeline would also be supported if a mapping can be made from the pipeline of the future API to the pipeline of the graphics processor.

Graphics Pipeline Programming

FIG. 9A is a block diagram illustrating a graphics processor command format 900 according to some embodiments. FIG. 9B is a block diagram illustrating a graphics processor command sequence 910 according to an embodiment. The solid lined boxes in FIG. 9A illustrate the components that are generally included in a graphics command while the dashed lines include components that are optional or that are only included in a sub-set of the graphics commands. The exemplary graphics processor command format 900 of FIG. 9A includes data fields to identify a target client 902 of the command, a command operation code (opcode) 904, and the relevant data 906 for the command. A sub-opcode 905 and a command size 908 are also included in some commands.

In some embodiments, client 902 specifies the client unit of the graphics device that processes the command data. In some embodiments, a graphics processor command parser examines the client field of each command to condition the further processing of the command and route the command data to the appropriate client unit. In some embodiments, the graphics processor client units include a memory interface unit, a render unit, a 2D unit, a 3D unit, and a media unit. Each client unit has a corresponding processing pipeline that processes the commands. Once the command is received by the client unit, the client unit reads the opcode 904 and, if present, sub-opcode 905 to determine the operation to perform. The client unit performs the command using information in data field 906. For some commands an explicit command size 908 is expected to specify the size of the command. In some embodiments, the command parser automatically determines the size of at least some of the commands based on the command opcode. In some embodiments commands are aligned via multiples of a double word.

The flow diagram in FIG. 9B shows an exemplary graphics processor command sequence 910. In some embodiments, software or firmware of a data processing system that features an embodiment of a graphics processor uses a version of the command sequence shown to set up, execute, and terminate a set of graphics operations. A sample command sequence is shown and described for purposes of example only as embodiments are not limited to these specific commands or to this command sequence. Moreover, the commands may be issued as batch of commands in a command sequence, such that the graphics processor will process the sequence of commands in at least partially concurrence.

In some embodiments, the graphics processor command sequence 910 may begin with a pipeline flush command 912 to cause any active graphics pipeline to complete the currently pending commands for the pipeline. In some embodiments, the 3D pipeline 922 and the media pipeline 924 do not operate concurrently. The pipeline flush is performed to cause the active graphics pipeline to complete any pending commands. In response to a pipeline flush, the command parser for the graphics processor will pause command processing until the active drawing engines complete pending operations and the relevant read caches are invalidated. Optionally, any data in the render cache that is marked 'dirty' can be flushed to memory. In some embodiments, pipeline flush command 912 can be used for pipeline synchronization or before placing the graphics processor into a low power state.

In some embodiments, a pipeline select command 913 is used when a command sequence requires the graphics processor to explicitly switch between pipelines. In some embodiments, a pipeline select command 913 is required only once within an execution context before issuing pipeline commands unless the context is to issue commands for both pipelines. In some embodiments, a pipeline flush command is 912 is required immediately before a pipeline switch via the pipeline select command 913.

In some embodiments, a pipeline control command 914 configures a graphics pipeline for operation and is used to program the 3D pipeline 922 and the media pipeline 924. In some embodiments, pipeline control command 914 configures the pipeline state for the active pipeline. In one embodiment, the pipeline control command 914 is used for pipeline synchronization and to clear data from one or more cache memories within the active pipeline before processing a batch of commands.

In some embodiments, return buffer state commands 916 are used to configure a set of return buffers for the respective pipelines to write data. Some pipeline operations require the allocation, selection, or configuration of one or more return buffers into which the operations write intermediate data during processing. In some embodiments, the graphics processor also uses one or more return buffers to store output data and to perform cross thread communication. In some embodiments, the return buffer state 916 includes selecting the size and number of return buffers to use for a set of pipeline operations.

The remaining commands in the command sequence differ based on the active pipeline for operations. Based on a pipeline determination 920, the command sequence is tailored to the 3D pipeline 922 beginning with the 3D pipeline state 930, or the media pipeline 924 beginning at the media pipeline state 940.

The commands for the 3D pipeline state 930 include 3D state setting commands for vertex buffer state, vertex element state, constant color state, depth buffer state, and other state variables that are to be configured before 3D primitive commands are processed. The values of these commands are determined at least in part based the particular 3D API in use. In some embodiments, 3D pipeline state 930 commands are also able to selectively disable or bypass certain pipeline elements if those elements will not be used.

In some embodiments, 3D primitive 932 command is used to submit 3D primitives to be processed by the 3D pipeline. Commands and associated parameters that are passed to the graphics processor via the 3D primitive 932 command are forwarded to the vertex fetch function in the graphics pipeline. The vertex fetch function uses the 3D primitive 932 command data to generate vertex data structures. The vertex data structures are stored in one or more return buffers. In some embodiments, 3D primitive 932 command is used to perform vertex operations on 3D primitives via vertex shaders. To process vertex shaders, 3D pipeline 922 dispatches shader execution threads to graphics processor execution units.

In some embodiments, 3D pipeline 922 is triggered via an execute 934 command or event. In some embodiments, a register write triggers command execution. In some embodiments execution is triggered via a 'go' or 'kick' command in the command sequence. In one embodiment command execution is triggered using a pipeline synchronization command to flush the command sequence through the graphics pipeline. The 3D pipeline will perform geometry processing for the 3D primitives. Once operations are complete, the resulting geometric objects are rasterized and the pixel engine colors the resulting pixels. Additional commands to control pixel shading and pixel back end operations may also be included for those operations.

In some embodiments, the graphics processor command sequence 910 follows the media pipeline 924 path when performing media operations. In general, the specific use and manner of programming for the media pipeline 924 depends on the media or compute operations to be performed. Specific media decode operations may be offloaded to the media pipeline during media decode. In some embodiments, the media pipeline can also be bypassed and media decode can be performed in whole or in part using resources provided by one or more general-purpose processing cores. In one embodiment, the media pipeline also includes elements for general-purpose graphics processor unit (GPGPU) operations, where the graphics processor is used to perform SIMD vector operations using computational shader programs that are not explicitly related to the rendering of graphics primitives.

In some embodiments, media pipeline 924 is configured in a similar manner as the 3D pipeline 922. A set of media pipeline state commands 940 are dispatched or placed into in a command queue before the media object commands 942. In some embodiments, media pipeline state commands 940 include data to configure the media pipeline elements that will be used to process the media objects. This includes data to configure the video decode and video encode logic within the media pipeline, such as encode or decode format. In some embodiments, media pipeline state commands 940 also support the use one or more pointers to "indirect" state elements that contain a batch of state settings.

In some embodiments, media object commands 942 supply pointers to media objects for processing by the media pipeline. The media objects include memory buffers containing video data to be processed. In some embodiments, all media pipeline states must be valid before issuing a media object command 942. Once the pipeline state is configured and media object commands 942 are queued, the media pipeline 924 is triggered via an execute command 944 or an equivalent execute event (e.g., register write). Output from media pipeline 924 may then be post processed by operations provided by the 3D pipeline 922 or the media pipeline 924. In some embodiments, GPGPU operations are configured and executed in a similar manner as media operations.

Graphics Software Architecture

Figure 10:
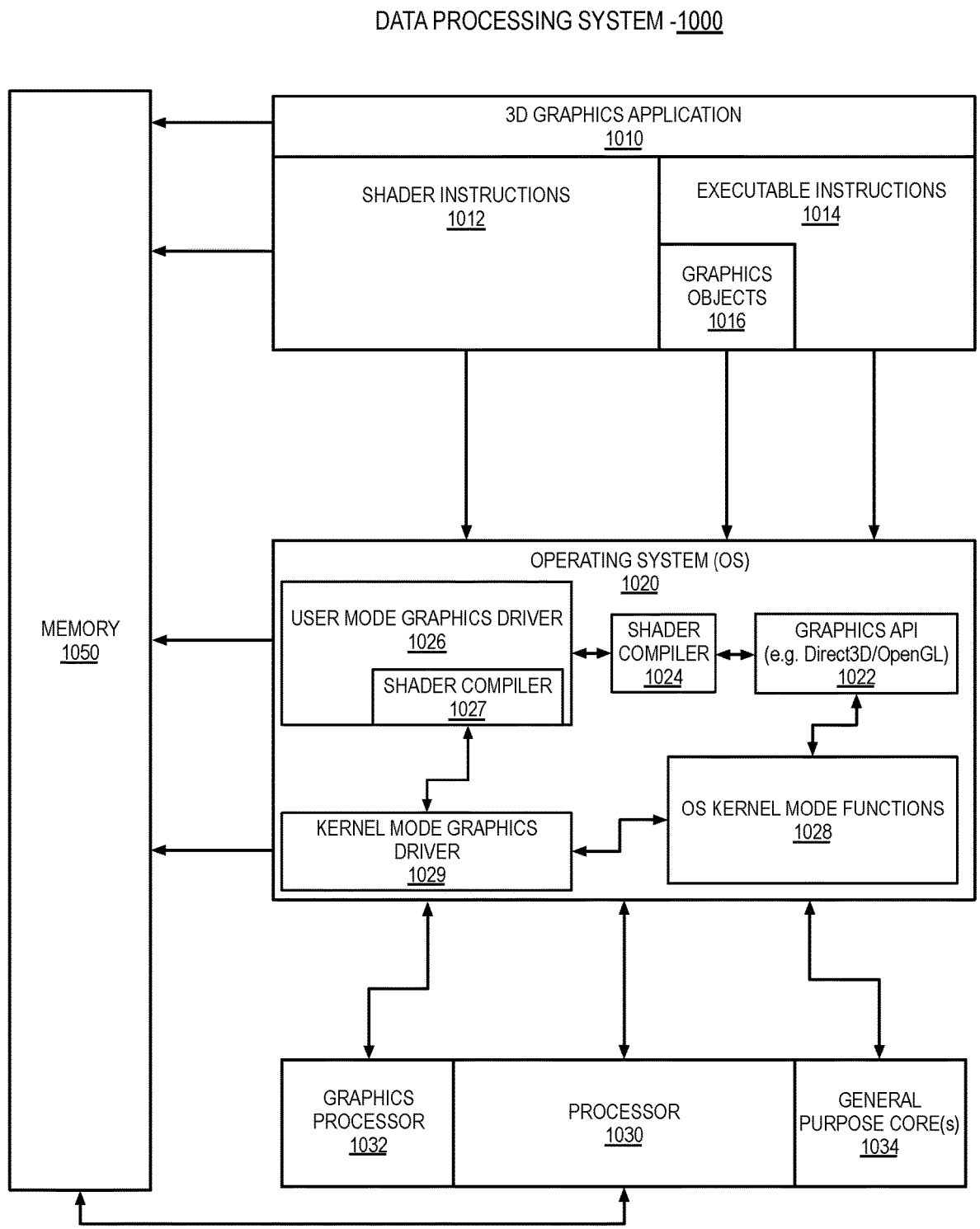
FIG. 10 illustrates exemplary graphics software architecture for a data processing system according to an embodiment.

FIG. 10 illustrates exemplary graphics software architecture for a data processing system 1000 according to some embodiments. In some embodiments, software architecture includes a 3D graphics application 1010, an operating system 1020, and at least one processor 1030. In some embodiments, processor 1030 includes a graphics processor 1032 and one or more general-purpose processor core(s) 1034. The graphics application 1010 and operating system 1020 each execute in the system memory 1050 of the data processing system.

In some embodiments, 3D graphics application 1010 contains one or more shader programs including shader instructions 1012. The shader language instructions may be in a high-level shader language, such as the High Level Shader Language (HLSL) or the OpenGL Shader Language (GLSL). The application also includes executable instructions 1014 in a machine language suitable for execution by the general-purpose processor core 1034. The application also includes graphics objects 1016 defined by vertex data.

In some embodiments, operating system 1020 is a Microsoft® Windows® operating system from the Microsoft Corporation, a proprietary UNIX-like operating system, or an open source UNIX-like operating system using a variant of the Linux kernel. The operating system 1020 can support a graphics API 1022 such as the Direct3D API or the OpenGL API. When the Direct3D API is in use, the operating system 1020 uses a front-end shader compiler 1024 to compile any shader instructions 1012 in HLSL into a lower-level shader language. The compilation may be a just-in-time (JIT) compilation or the application can perform shader pre-compilation. In some embodiments, high-level shaders are compiled into low-level shaders during the compilation of the 3D graphics application 1010.

In some embodiments, user mode graphics driver 1026 contains a back-end shader compiler 1027 to convert the shader instructions 1012 into a hardware specific representation. When the OpenGL API is in use, shader instructions 1012 in the GLSL high-level language are passed to a user mode graphics driver 1026 for compilation. In some embodiments, user mode graphics driver 1026 uses operating system kernel mode functions 1028 to communicate with a kernel mode graphics driver 1029. In some embodiments, kernel mode graphics driver 1029 communicates with graphics processor 1032 to dispatch commands and instructions.

IP Core Implementations

One or more aspects of at least one embodiment may be implemented by representative code stored on a machine-readable medium which represents and/or defines logic within an integrated circuit such as a processor. For example, the machine-readable medium may include instructions which represent various logic within the processor. When read by a machine, the instructions may cause the machine to fabricate the logic to perform the techniques described herein. Such representations, known as "IP cores," are reusable units of logic for an integrated circuit that may be stored on a tangible, machine-readable medium as a hardware model that describes the structure of the integrated circuit. The hardware model may be supplied to various customers or manufacturing facilities, which load the hardware model on fabrication machines that manufacture the integrated circuit. The integrated circuit may be fabricated such that the circuit performs operations described in association with any of the embodiments described herein.

Figure 11:
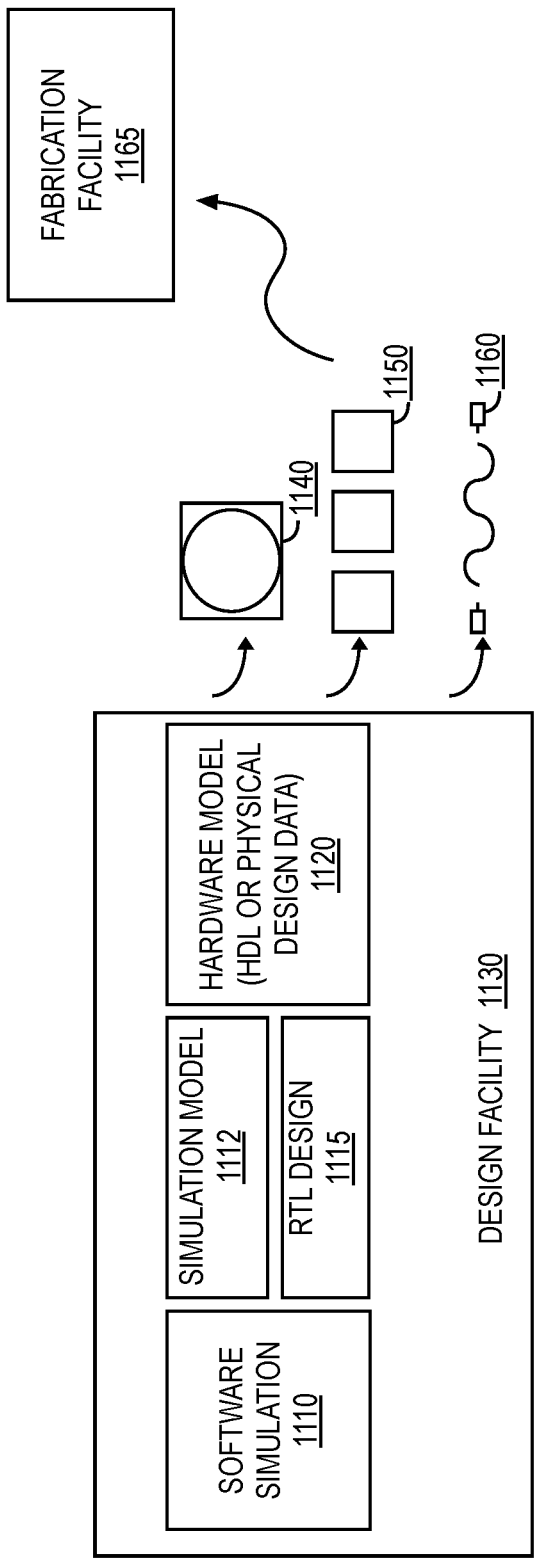
FIG. 11 is a block diagram illustrating an IP core development system that may be used to manufacture an integrated circuit to perform operations according to an embodiment.

FIG. 11 is a block diagram illustrating an IP core development system 1100 that may be used to manufacture an integrated circuit to perform operations according to an embodiment. The IP core development system 1100 may be used to generate modular, re-usable designs that can be incorporated into a larger design or used to construct an entire integrated circuit (e.g., an SOC integrated circuit). A design facility 1130 can generate a software simulation 1110 of an IP core design in a high level programming language (e.g., C/C++). The software simulation 1110 can be used to design, test, and verify the behavior of the IP core. A register transfer level (RTL) design can then be created or synthesized from the simulation model 1112. The RTL design 1115 is an abstraction of the behavior of the integrated circuit that models the flow of digital signals between hardware registers, including the associated logic performed using the modeled digital signals. In addition to an RTL design 1115, lower-level designs at the logic level or transistor level may also be created, designed, or synthesized. Thus, the particular details of the initial design and simulation may vary.

The RTL design 1115 or equivalent may be further synthesized by the design facility into a hardware model 1120, which may be in a hardware description language (HDL), or some other representation of physical design data. The HDL may be further simulated or tested to verify the IP core design. The IP core design can be stored for delivery to a 3$^{rd}$ party fabrication facility 1165 using non-volatile memory 1140 (e.g., hard disk, flash memory, or any non-volatile storage medium). Alternatively, the IP core design may be transmitted (e.g., via the Internet) over a wired connection 1150 or wireless connection 1160. The fabrication facility 1165 may then fabricate an integrated circuit that is based at least in part on the IP core design. The fabricated integrated circuit can be configured to perform operations in accordance with at least one embodiment described herein.

Figure 12:
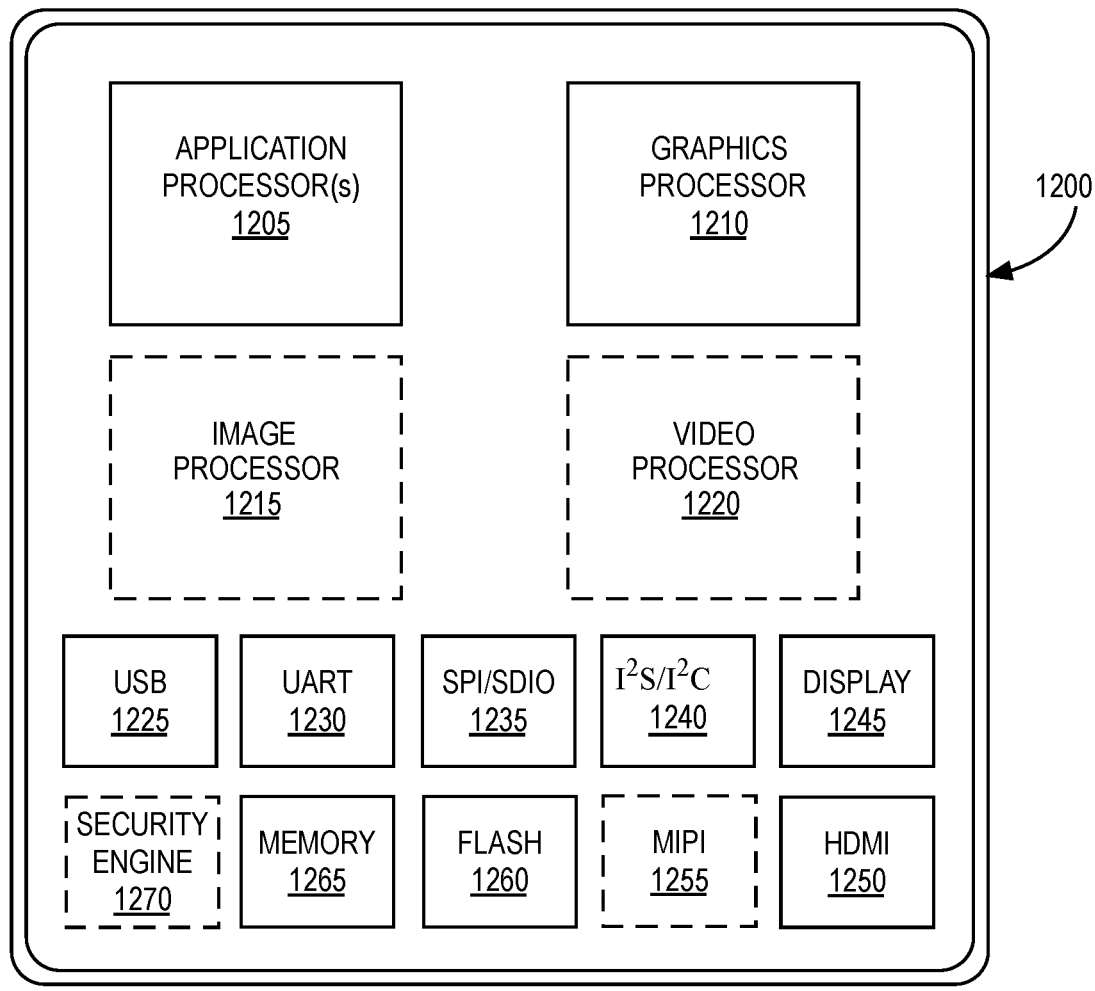
FIG. 12 is a block diagram illustrating an exemplary system on a chip integrated circuit that may be fabricated using one or more IP cores, according to an embodiment.

FIG. 12 is a block diagram illustrating an exemplary system on a chip integrated circuit 1200 that may be fabricated using one or more IP cores, according to an embodiment. The exemplary integrated circuit includes one or more application processors 1205 (e.g., CPUs), at least one graphics processor 1210, and may additionally include an image processor 1215 and/or a video processor 1220, any of which may be a modular IP core from the same or multiple different design facilities. The integrated circuit includes peripheral or bus logic including a USB controller 1225, UART controller 1230, an SPI/SDIO controller 1235, and an I$^2$S/I$^2$C controller 1240. Additionally, the integrated circuit can include a display device 1245 coupled to one or more of a high-definition multimedia interface (HDMI) controller 1250 and a mobile industry processor interface (MIPI) display interface 1255. Storage may be provided by a flash memory subsystem 1260 including flash memory and a flash memory controller. Memory interface may be provided via a memory controller 1265 for access to SDRAM or SRAM memory devices. Some integrated circuits additionally include an embedded security engine 1270.

Additionally, other logic and circuits may be included in the processor of integrated circuit 1200, including additional graphics processors/cores, peripheral interface controllers, or general-purpose processor cores.

Compressed Bounding Volume Hierarchy

An N-wide BVH node includes N bounding volumes that correspond to the N children of the given node. In addition to a bounding volume, a reference to each child node is included. The reference is typically either an index or a pointer. One bit of the index or pointer can be assigned to indicate whether the node is an internal node or a leaf node. A commonly used bounding volume format, particularly for ray tracing, is the axis-aligned bounding volume (AABV) or axis-aligned bounding box (AABB). An AABB can be defined only with the minimum and maximum extents in each dimension, providing for an efficient ray intersection test. Typically, an AABB is stored in an uncompressed format using single-precision (e.g., 4-byte) floating-point value. To define an uncompressed three-dimensional AABB, two single precision floating point values (min/max) for each of three axes are used (e.g., 2×3×4), resulting in 24-bytes to store the extents of the AAAB, plus the index or pointer to the child node (e.g., a 4-byte integer or an 8-byte pointer). Accordingly, each AABB defined for a BVH node may be up to 32-bytes. Thus, a binary BVH node with children may require 64 bytes, a 4-wide BVH node may require 128 bytes, and an 8-wide BVH may require up to 256 bytes.

Oriented bounding boxes using discrete oriented polytopes in k-directions (k-DOPs) are also a commonly used bounding volume format that may be used with embodiments described herein. For k-DOPs, lower and upper bounds are stored for multiple arbitrary directions. In contrast to AABBs, k-DOPs are not limited to bounds in the direction of the coordinate axes only, but bound the geometry in any number of directions in space.

To reduce the memory size requirements for using a bounding volume hierarchy (BVH), the BVH data may be stored in a compressed format. For example, each AABB can be stored in a hierarchically compressed format relative the parent of the AABB. However, hierarchical encoding may cause issues with ray tracing implementations when BVH node references are pushed on to the stack during ray traversal. When later dereferenced, the path to the root node is followed to compute the final AABB, potentially resulting in long dependency chain. An alternative solution stores the current AABB on the stack, which requires a significant amount of stack memory to store the additional data, as the stack depth per ray typically ranges between 40 to 60 entries.

Embodiments described herein provide for an apparatus, system, method, and various logical processes for compressing BVH nodes individually in a simple and efficient manner, without requiring a reference to the parent node or extra stack storage space to decompress the child bounds of a node, significantly reducing the complexity of implementing ray tracing acceleration hardware. To reduce memory requirements, N child bounding boxes of an N-wide BVH node are encoded relative to the merged box of all children by storing the parent bounding box with absolute coordinates and full (floating point) precision, while the child bounding boxes are stored relative to the parent bounding box with lower precision.

The approach described herein reduces memory storage and bandwidth requirements compared to traditional approaches that store full precision bounding boxes for all children. Each node may be decompressed separately of other nodes. Consequently, complete bounding boxes are not stored on the stack during traversal and the entire path from the root of the tree is not re-traversed to decompress nodes on pop operations. Additionally, ray-node intersection testing can be performed at reduced precision, reducing the required complexity of the arithmetic hardware units.

Bounding Volumes and Ray-Box Intersection Testing

Figure 13:
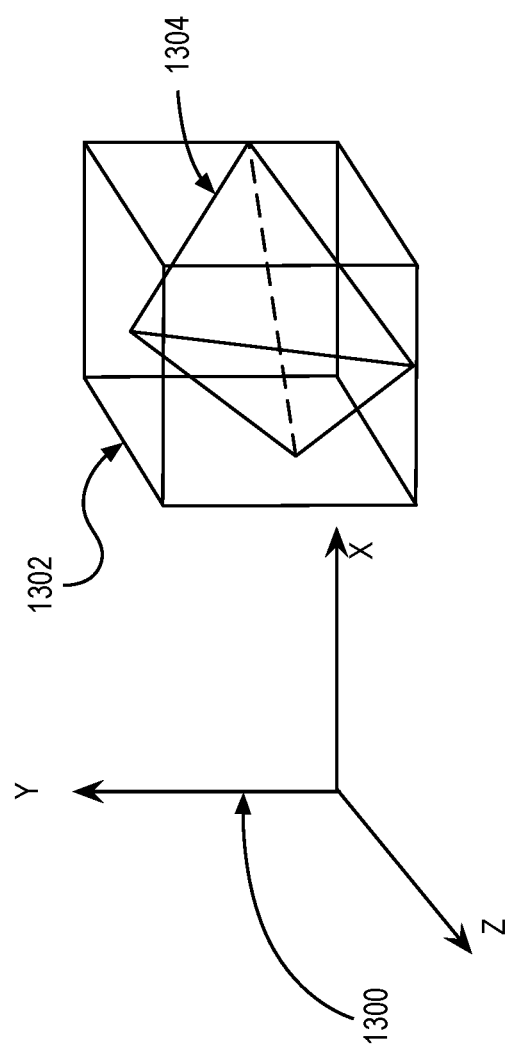
FIG. 13 is an illustration of a bounding volume, according to embodiments.

FIG. 13 is an illustration of a bounding volume 1302, according to embodiments. The bounding volume 1302 illustrated is axis aligned to a three dimensional axis 1300. However, embodiments are applicable to different bounding representations (e.g., oriented bounding boxes, discrete oriented polytopes, spheres, etc.) and to an arbitrary number of dimensions. The bounding volume 1302 defines a minimum and maximum extent of a three dimensional object 1304 along each dimension of the axis 1300. To generate a BVH for a scene, a bounding box is constructed for each object in the set of objects in the scene. A set of parent bounding boxes can then be constructed around groupings of the bounding boxes constructed for each object.

Figure 14B:
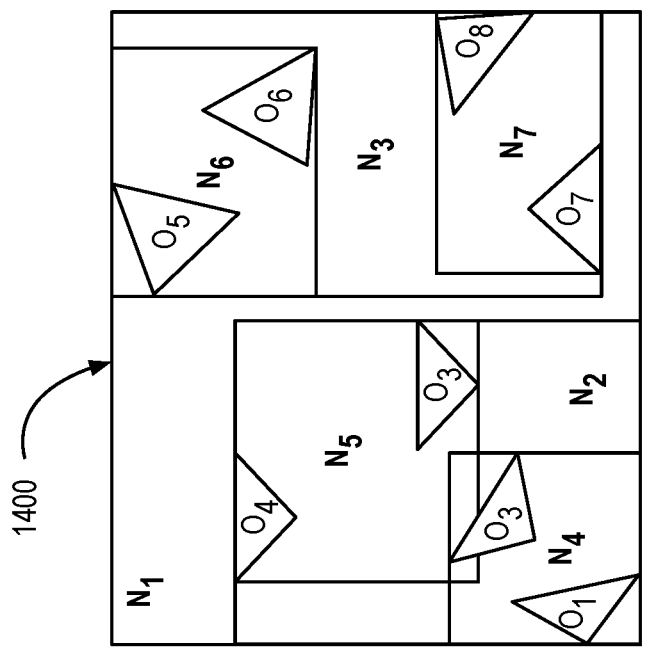
FIGS. 14A-B illustrate a representation of a bounding volume hierarchy.
Figure 14A:
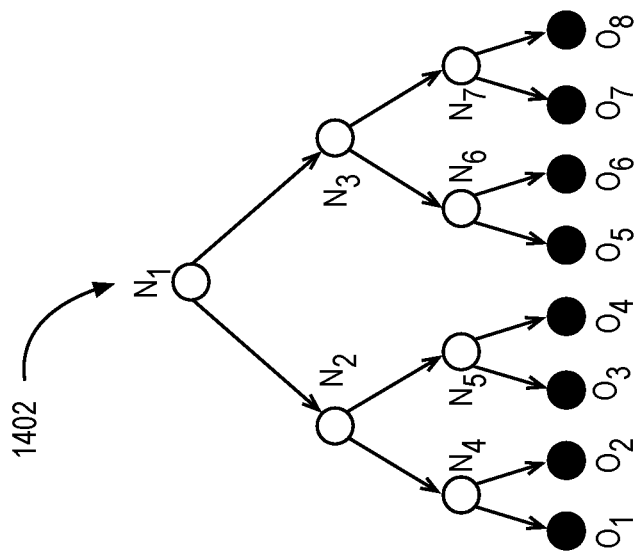

FIGS. 14A-B illustrate a representation of a bounding volume hierarchy for two dimensional objects. FIG. 14A shows a set of bounding volumes 1400 around a set of geometric objects. FIG. 14B shows an ordered tree 1402 of the bounding volumes 1400 of FIG. 14A.

As shown in FIG. 14A, the set of bounding volumes 1400 includes a root bounding volume $N_1$, which is a parent bounding volume for all other bounding volumes $N_2$-$N_7$. Bounding volumes $N_2$ and $N_3$ are internal bounding volumes between the root volume $N_1$ and the leaf volumes $N_4$-$N_7$. The leaf volumes $N_4$-$N_7$ include geometric objects $O_1$-$O_8$ for a scene.

FIG. 14B shows an ordered tree 1402 of the bounding volumes $N_1$-$N_7$ and geometric objects $O_1$-$O_8$. The illustrated ordered tree 1402 is a binary tree in which each node of the tree has two child nodes. A data structure configured to contain information for each node can include bounding information for the bounding volume (e.g., bounding box) of the node, as well as at least a reference to the node of each child of the node.

The ordered tree 1402 representation of the bounding volumes defines a hierarchy that can be used to perform a hierarchical version of various operations including, but not limited to collision detection and ray-box intersection. In the instance of ray-box intersection, nodes can be tested in a hierarchical fashion beginning with the root node $N_1$ which is the parent node to all other bounding volume nodes in the hierarchy. If the ray-box intersection test for the root node $N_1$ fails, all other nodes of the tree may be bypassed. If the ray-box intersection test for the root node $N_1$ passes, subtrees of the tree can be tested and traversed or bypassed in an ordered fashion until, at the least, the set of intersected leaf nodes $N_4$-$N_7$ are determined. The precise testing and traversal algorithms used can vary according to embodiments.

Figure 15:
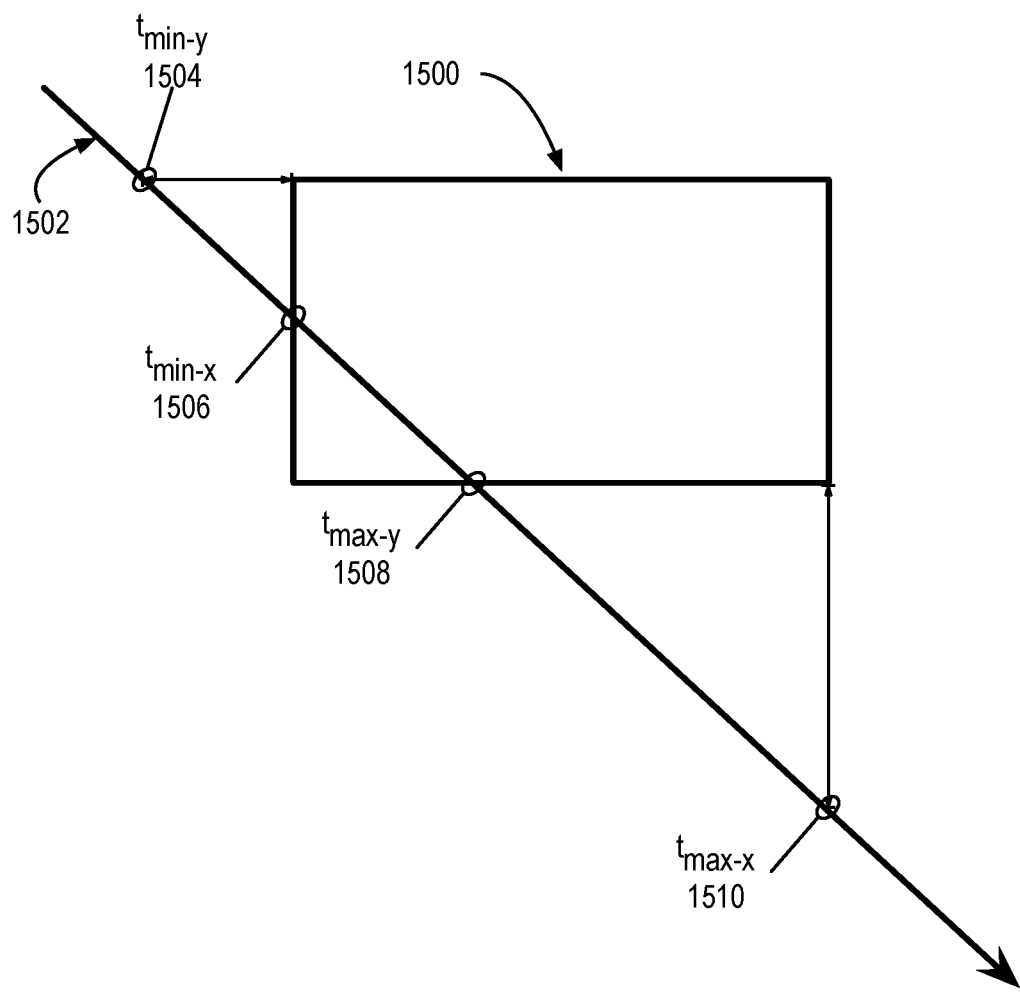
FIG. 15 is an illustration of a ray-box intersection test, according to an embodiment.

FIG. 15 is an illustration of a ray-box intersection test, according to an embodiment. During the ray-box intersection test, a ray 1502 is cast and the equation defining the ray can be used to determine whether the ray intersects the planes that define the bounding box 1500 under test. The ray 1502 can be expressed as $O+D \cdot t$ where O corresponds to the origin of the ray D is the direction of the ray and t is a real value. Changing t can be used to define any point along the ray. The ray 1502 is said to intersect the bounding box 1500 when the largest entry plane intersection distance is smaller than or equal to the smallest exit plane distance. For the ray 1502 of FIG. 15, the y plane entry intersection distance is shown as $t_{min\text{-}y}$ 1504. The y plane exit intersection distance is shown as $t_{max\text{-}y}$ 1508. The x plane entry intersection distance can be calculated at $t_{min\text{-}x}$ 1506, the x plane exit intersection distance is shown as $t_{max\text{-}x}$ 1510. Accordingly, the given ray 1502 can be mathematically shown to intersect the bounding box, at least along the x and y planes, because $t_{min\text{-}x}$ 1506 is less than $t_{max\text{-}y}$ 1508. To perform the ray-box intersection test using a graphics processor, the graphics processor is configured to store an acceleration data structure that defines, at the least, each bounding box to be tested. For acceleration using a bounding volume hierarchy, at the least, a reference to the child nodes to the bounding box is stored.

Bounding Volume Node Compression

For an axis-aligned bounding box in 3D space, the acceleration data structure can store the lower and upper bounds of the bounding box in three dimensions. A software implementation can use 32-bit floating point numbers to store these bounds, which adds up to 2×3×4=24-bytes per bounding box. For an N-wide BVH node one has to store N boxes and N child references. In total, the storage for a 4-wide BVH node is N*24 bytes plus N*4 bytes for the child reference, assuming 4 bytes per reference, which results in a total of (24+4)*N bytes, for a total of 112 bytes for a 4-wide BVH node and 224 bytes for an 8-wide BVH node.

In one embodiment the size of a BVH node is reduced by storing a single higher accuracy parent bounding box that encloses all child bounding boxes, and storing each child bounding box with lower accuracy relative to that parent box. Depending on the usage scenario different number representations may be used to store the high accuracy parent bounding box and the lower accuracy relative child bounds.

Figure 16:
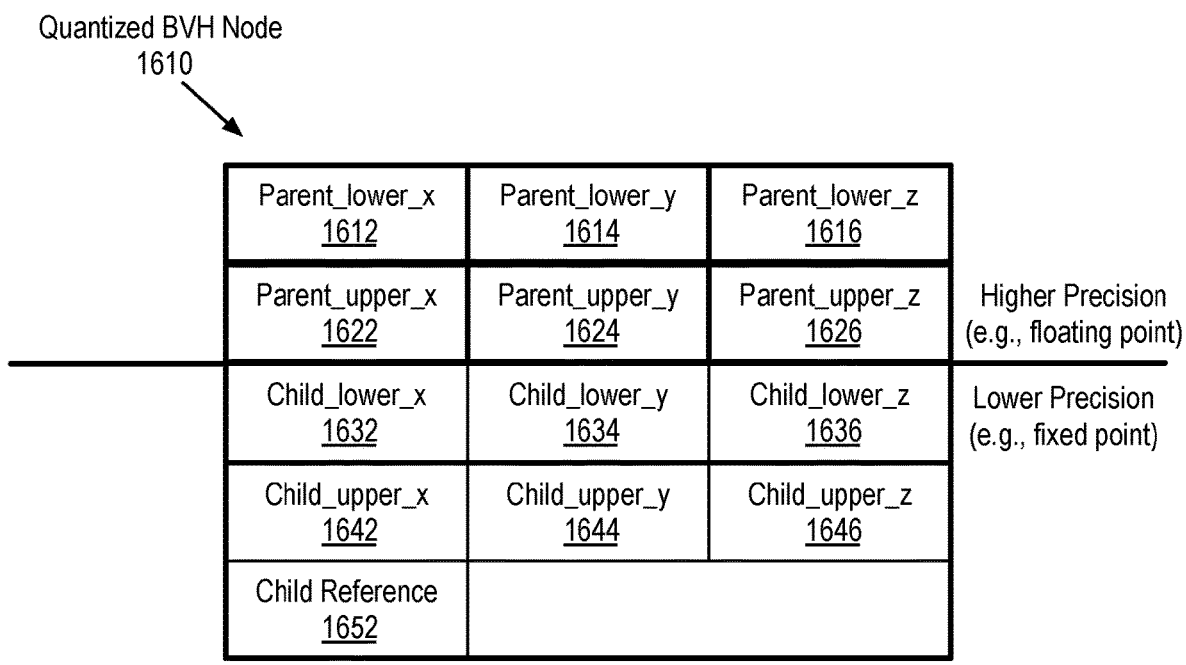
FIG. 16 is a block diagram illustrating an exemplary quantized BVH node 1610, according to an embodiment.

FIG. 16 is a block diagram illustrating an exemplary quantized BVH node 1610, according to an embodiment. The quantized BVH node 1610 can include higher precision values to define a parent bounding box for a BVH node. For example, parent_lower_x 1612, parent_lower_y 1614, parent_lower_z 1616, parent upper_x 1622, parent_upper_y 1624, and parent_upper_z 1626 can be stored using single or double precision floating-point values. The values for the child bounding box for each child bounding box stored in the node can be quantized and stored as lower precision values, such as fixed point representations for bounding box values that are defined relative to the parent bounding box. For example, child_lower_x 1632, child_lower_y 1634, child_lower_z 1636, as well as child_upper_x 1642, child_upper_y 1644, and child_upper_z 1646 can be stored as lower precision fixed point values. Additionally a child reference 1652 can be stored for each child. The child reference 1652 can be an index into a table that stores the location of each child node or can be a pointer to the child node.

As shown in FIG. 16, a single or double precision floating-point value may be used to store the parent bounding box, while M-bit fixed point values may be used to encode the relative child bounding boxes. A data structure for the quantized BVH node 1610 of FIG. 16 can be defined by the quantized N-wide BVH node shown in Table 1 below.

TABLE 1

Quantized N-wide BVH Node.

```
struct QuantizedNode
{
    Real parent_lower_x, parent_lower_y, parent_lower_z;
    Real parent_upper_x, parent_upper_y, parent_upper_z;

UintM child_lower_x[N], child_lower_y[N], child_lower_z[N];
    UintM child_upper_x[N], child_upper_y[N], child_upper_z[N];
    Reference child [N];
};
```

The quantized node of Table 1 realizes a reduced data structure size by quantizing the child values while maintaining a baseline level of accuracy by storing higher precision values for the extents of the parent bounding box. In Table 1, Real denotes a higher accuracy number representation (e.g. 32-bit or 64-bit floating values), and UintM denotes lower accuracy unsigned integer numbers using M-bits of accuracy used to represent fixed point numbers. Reference denotes the type used to represent references to child nodes (e.g. 4-byte indices of 8-byte pointers).

A typical instantiation of this approach can use 32-bit child references, single precision floating point values for the parent bounds, and M=8 bits (1 byte) for the relative child bounds. This compressed node would then require 6*4+6*N+4*N bytes. For a 4-wide BVH this totals 64 bytes (compared to 112 bytes for the uncompressed version) and for an 8-wide BVH this totals 104 Bytes (compared to 224 bytes for the uncompressed version).

To traverse such a compressed BVH node, graphics processing logic can decompress the relative child bounding boxes and then intersect the decompressed node using standard approaches. The uncompressed lower bound can then be obtained for each dimension x, y, and z. Equation 1 below shows a formula to obtain a child lower_x value.

Child node decompression for BVH node.   Equation 1

$$child_{lower_x} = parent_{lower_x} + child_{lower_x} \times \frac{parent_{upper_x} - parent_{lower_x}}{(2^M - 1)}$$

In Equation 1 above, M represents the number of bits of accuracy for the fixed point representation of the child bounds. Logic to decompress child data for each dimension of the BVH node can be implemented as in Table 2 below.

TABLE 2

Child Node Decompression for a BVH Node float child_lower_x = node.parent_lower.x + node.child_lower_x[i]/
(2^M−1)*(node.parent_upper_x-node.parent_lower_x);
float child_lower_y = node.parent_lower.y + node.child_lower_y[i]/
(2^M−1)*(node.parent_upper_y-node.parent_lower_y);
float child_lower_z = node.parent_lower.z + node.child_lower_z[i]/
(2^M−1)*(node.parent_upper_z-node.parent_lower_z);

Table 2 illustrates a calculation of a floating point value for the lower bounds of a child bounding box based on floating point value for the extents of the parent pounding box and a fixed point value of a child bounding box that is stored as an offset from an extent of the parent bounding box. The child upper bounds may be computed in an analogous manner.

In one embodiment the performance of the decompression can be improved by storing the scaled parent bounding box sizes, e.g., (parent_upper_x-parent_lower_x)/(2^M−1) instead of the parent_upper_x/y/z values. In such embodiment, a child bounding box extent can be computed according to the example logic shown in Table 3.

TABLE 3

Enhanced Child Node Decompression for a BVH Node float child_lower_x = node.parent_lower.x +
node.child_lower_x[i]*node.scaled_parent_size_x;
float child_lower_y = node.parent_lower.y +
node.child_lower_y[i]*node.scaled_parent_size_y;
float child_lower_z = node.parent_lower.z +
node.child_lower_z[i]*node.scaled_parent_size_z;

Note that in the optimized version the decompression/dequantization can be formulated as a MAD-instruction (multiply-and-add) where hardware support exists for such instruction. In one embodiment, the operations for each child node can be performed using SIMD/vector logic, enabling the simultaneous evaluation of each child within the node.

While the approach described above approach works well for a shader or CPU based implementation, one embodiment provides specialized hardware that is configured to perform ray-tracing operations including ray-box intersection tests using a bounding volume hierarchy. In such embodiment the specialized hardware can be configured to store a further quantized representation of the BVH node data and de-quantize such data automatically when performing a ray-box intersection test.

FIG. 17 is a block diagram of a composite floating point data block 1700 for use by a quantized BVH node 1710 according to a further embodiment. In one embodiment, in contrast with a 32-bit single precision floating point representation or a 64-bit double precision floating point representation of the extents of the parent bounding box, logic to support a composite floating point data block 1700 can be defined by specialized logic within a graphics processor. The composite floating point (CFP) data block 1700 can include a 1-bit sign bit 1702, a variable sized (E-bit) signed integer exponent 1704 and a variable sized (K-bit) mantissa 1706. Multiple values for E and K may be configurable by adjusting values stored in configuration registers of the graphics processor. In one embodiment, the values for E and K may be independently configured within a range of values. In one embodiment a fixed set of interrelated values for E and K may be selected from via the configuration registers. In one embodiment, a single value each for E and K is hard coded into BVH logic of the graphics processor. The values E and K enable the CFP data block 1700 to be used as a customized (e.g., special purpose) floating point data type that can be tailored to the data set.

Using the CFP data block 1700, the graphics processor can be configured to store bounding box data in the quantized BVH node 1710. In one embodiment the lower bounds of the parent bounding box (parent_lower_x 1712, parent_lower_y 1714, parent_lower_z 1716) are stored at a level of precision determined by the E and K values selected for the CFP data block 1700. The level of precision of the storage values for the lower bound of the parent bounding box will generally be set to a higher precision than the values of the child bounding box (child_lower_x 1724, child_upper_x 1726, child_lower_y 1734, child_upper_y 1736, child_lower_z 1744, child_upper_z 1746), which will be stored as fixed point values. A scaled parent bounding box size is stored as a power of 2 exponent (e.g., exp_x 1722, exp_y 1732, exp_z 1742). Additionally, a reference for each child (e.g., child reference 1752) can be stored. The size of the quantized BVH node 1710 can scale based on the width (e.g., number of children) stored in each node, with amount of storage used to store the child references and the bounding box values for the child nodes increasing with each additional node.

Logic for an implementation of the quantized BVH node of FIG. 17 is shown in Table 4 below.

TABLE 4

Quantized N-wide BVH Node for Hardware Implementation.

struct QuantizedNodeHW
{
    struct Float { int1 sign; intE exp; uintK mantissa; };
    Float parent_lower_x, parent_lower_y, parent_lower_z;
    intE exp_x; uintM child_lower_x[N], child_upper_x[N];
    intE exp_y; uintM child_lower_y[N], child_upper_y[N];
    intE exp_z; uintM child_lower_z[N], child_upper_z[N];
    Reference child [N];
};

As shown in Table 4, a composite floating point data block (e.g., struct Float) can be defined to represent values for the parent bounding box. The Float structure includes a 1-bit sign (int1 sign), an E-bit signed integer to store power of 2 exponents (intE exp), and a K-bit unsigned integer (uintK mantissa) to represent the mantissa used to store the high accuracy bounds. For the child bounding box data, M-bit unsigned integers (uintM child_lower_x/y/z; uintM child_upper_x/y/z) can be used to store fixed point numbers to encode the relative child bounds.

For the example of E=8, K=16, M=8, and using 32 bits for the child references, the QuantizedNodeHW structure of Table 4 has a size of 52 bytes for a 4-wide BVH and a size of 92 bytes for a 8-wide BVH, which is a reduction in the structure size relative to the quantized node of Table 1 and a significant reduction in structure size relative to existing implementations. It will be noted that for the mantissa value (K=16) one bit of the mantissa may be implied, reducing the storage requirement to 15 bits.

The layout of the BVH node structure of Table 4 enables reduced hardware to perform ray-box intersection tests for the child bounding boxes. The hardware complexity is reduced based on several factors. A lower number of bits for K can be chosen, as the relative child bounds add additional M bits of accuracy. The scaled parent bounding box size is stored as a power of 2 (exp_x/y/z fields), which simplify the calculations. Additionally, the calculations are refactored to reduce the size of multipliers.

In one embodiment, ray intersection logic of the graphics processor calculates the hit distances of a ray to axis-aligned planes to perform a ray-box testing. The ray intersection logic can use BVH node logic including support for the quantized node structure of Table 4. The logic can calculate the distances to the lower bounds of the parent bounding box using the higher precision parent lower bounds and the quantized relative extents of the child boxes. Exemplary logic for x plane calculations is shown in Table 5 below.

TABLE 5

Ray-Box Intersection Distance Determination float dist_parent_lower_x = node.parent_lower_x *
rcp_ray_dir_x − ray_org_mul_rcp_ray_dir_x;
float dist_child_lower_x = dist_parent_lower_x +
rcp_ray_dir_x*node.child_lower_x[i]*2^node.exp_x;
float dist_child_upper_x = dist_parent_lower_x +
rcp_ray_dir_x*node.child_upper_x[i]*2^node.exp_x;

With respect to the logic of Table 5, if a single precision floating point accuracy is assumed to represent the ray, then a 23-bit times a 15-bit multiplier can be used, as the parent_lower_x value is stored with 15 bits of mantissa. The distance to the lower bounds of the parent bounding box on the y and z planes can be calculated in a manner analogous to the calculation for dist_parent_lower_x.

Using the parent lower bounds, the intersection distances to the relative child bounding boxes can be calculated for each child bounding box, as exemplified by the calculation for dist_child_lower_x and dist_child_upper_x as in Table 5. The calculation of the dist_child_lower/upper_x/y/z values can be performed using a 23-bit times 8-bit multiplier.

Figure 18:
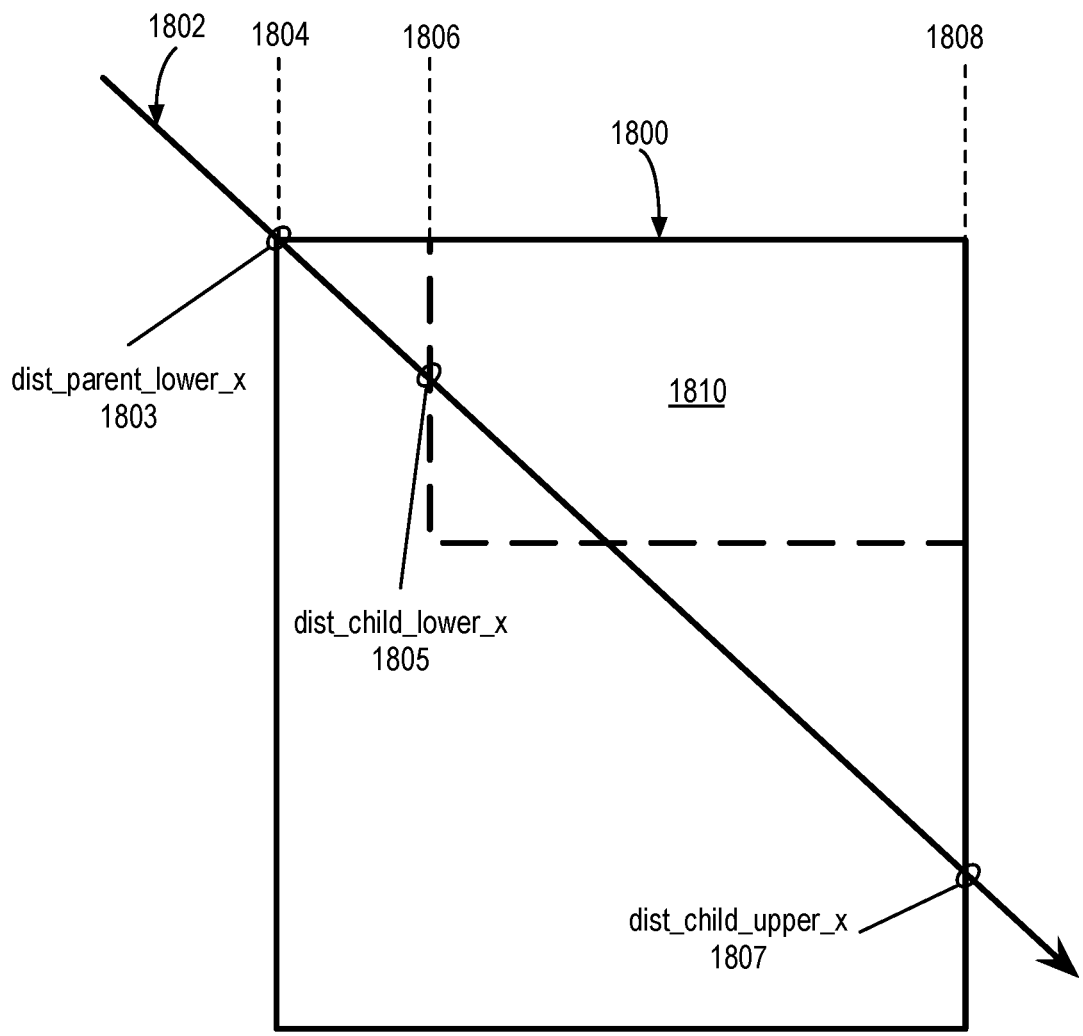
FIG. 18 illustrates ray-box intersection using quantized values to define a child bounding box relative to a parent bounding box, according to an embodiment.

FIG. 18 illustrates ray-box intersection using quantized values to define a child bounding box 1810 relative to a parent bounding box 1800, according to an embodiment. Applying the ray-box intersection distance determination equations for the x plane shown in Table 5, a distance along a ray 1802 at which the ray intersects the bound of the parent bounding box 1800 along the x plane can be determined. The position dist_parent_lower_x 1803 can be determined in which the ray 1802 crosses the lower bounding plane 1804 of the parent bounding box 1800. Based on the dist_parent_lower_x 1803, a dist_child_lower_x 1805 can be determined where the ray intersects the minimum bounding plane 1806 of the child bounding box 1810. Additionally, based on the dist_parent_lower_x 1803, a dist_child_upper_x 1807 can be determined for a position in which the ray intersects the maximum bounding plane 1808 of the child bounding box 1810. A similar determination can be performed for each dimension in which the parent bounding box 1800 and the child bounding box 1810 are defined (e.g., along the y and z axis). The plane intersection distances can then be used to determine whether the ray intersects the child bounding box. In one embodiment, the graphics processing logic can determine intersection distances for multiple dimensions and multiple bounding boxes in a parallel manner using SIMD and/or vector logic. Additionally, at least a first portion of the calculations described herein may be performed on a graphics processor while a second portion of the calculations may be performed on one or more application processors coupled to the graphics processor.

Figure 19:
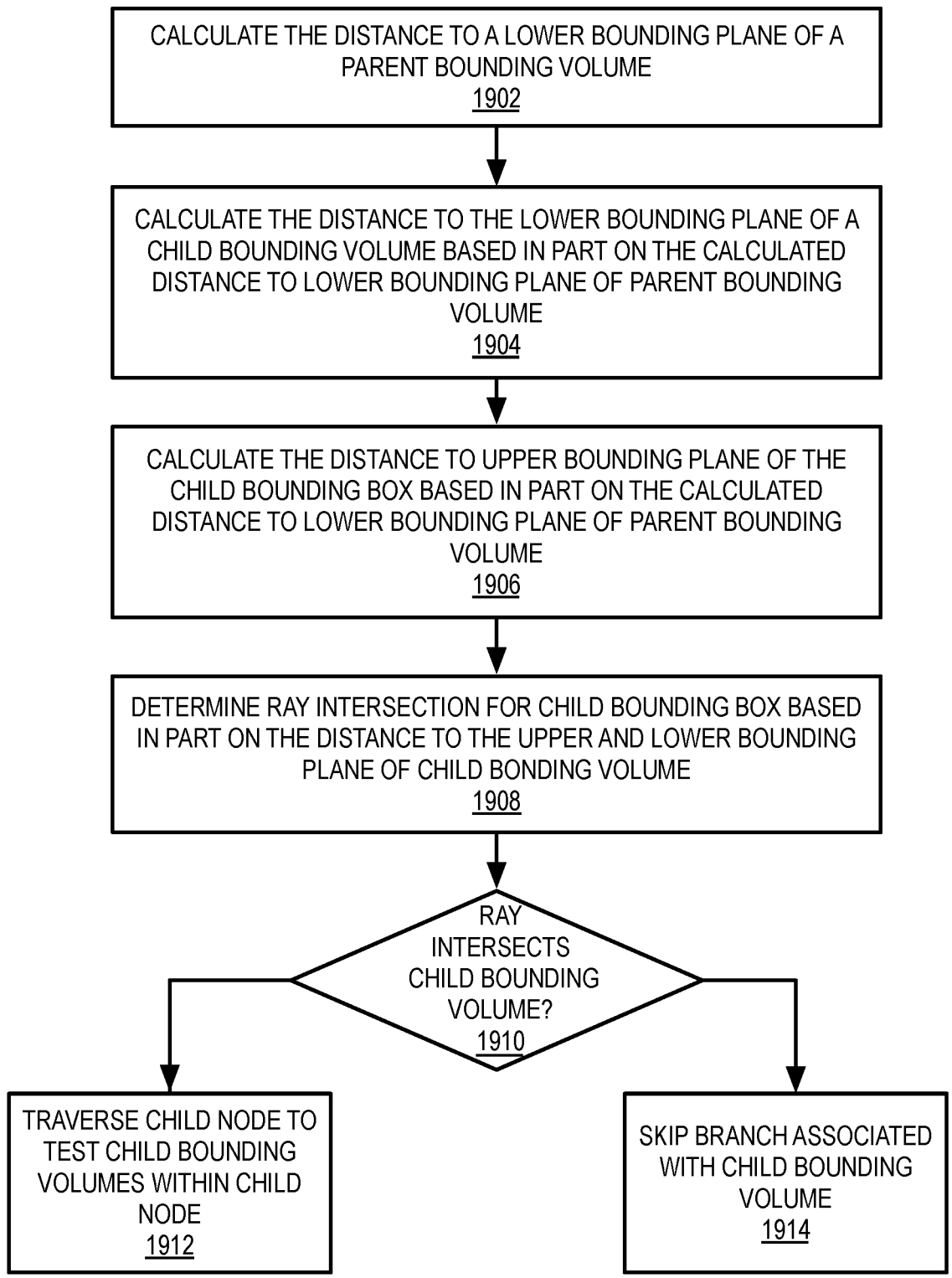
FIG. 19 is a flow diagram of BVH decompression and traversal logic, according to an embodiment.

FIG. 19 is a flow diagram of BVH decompression and traversal logic 1900, according to an embodiment. In one embodiment the BVH decompression and traversal logic resides in special purpose hardware logic of a graphics processor, or may be performed by shader logic executed on execution resources of the graphics processor. The BVH decompression and traversal logic 1900 can cause the graphics processor to perform operations to calculate the distance along a ray to the lower bounding plane of a parent bounding volume, as shown at block 1902. At block 1904, the logic can calculate the distance to the lower bounding plane of a child bounding volume based in part on the calculated distance to the lower bounding plane of the parent bounding volume. At block 1906, the logic can calculate the distance to the upper bounding plane of a child bounding volume based in part on the calculated distance to the lower bounding plane of the parent bounding volume.

At block 1908, the BVH decompression and traversal logic 1900 can determine ray intersection for the child bounding volume based in part on the distance to the upper and lower bounding plane of the child bounding volume, although intersection distances for each dimension of the bounding box will be used to determine intersection. In one embodiment the BVH decompression and traversal logic 1900 determines ray intersection for the child bounding volume by determining whether the largest entry plane intersection distance for the ray is smaller than or equal to the smallest exit plane distance. In other words, the ray intersects the child bounding volume when the ray enters the bounding volume along all defined planes before exiting the bounding volume along any of the defined planes. If at 1910 the BVH decompression and traversal logic 1900 determines that the ray intersects the child bounding volume, the logic can traverse the child node for the bounding volume to test the child bounding volumes within the child node, as shown at block 1912. At block 1912 a node traversal can be performed in which the reference to node associated with the intersected bounding box can be accessed. The child bounding volume can become the parent bounding volume and the children of the intersected bounding volume can be evaluated. If at 1910 the BVH decompression and traversal logic 1900 determines that the ray does not intersect the child bounding volume, the branch of the bounding hierarchy associated with the child bounding volume is skipped, as shown at block 1914, as the ray will not intersect any bounding volumes further down the sub-tree branch associated with a child bounding volume that is not intersected.

Further Compression Via Shared Plane Bounding Boxes

For any N-wide BVH using bounding boxes, the bounding volume hierarchy can be constructed such that each of the six sides of a 3D bounding box is shared by at least one child bounding box. In a 3D shared plane bounding box, $6 \times \log_2 N$ bits can be used to indicate whether a given plane of a parent bounding box is shared with a child bounding box. With N=4 for a 3D shared plane bounding box, 12-bits would be used to indicate shared planes, where each of two bits are used to identify which of the four children reuse each potentially shared parent plane. Each bit can be used to indicate whether a parent plane is re-used by a specific child. In the event of a 2-wide BVH, 6 additional bits can be added to indicate, for each plane of a parent bounding box, whether the plane (e.g., side) of the bounding box is shared by a child. Although the SPBB concepts can apply to an arbitrary number of dimensions, in one embodiment the benefits of the SPBB are generally the highest for a 2-wide (e.g., binary) SPBB.

The use of the shared plane bounding box can further reduce the amount of data stored when using BVH node quantization as described herein. In the example of the 3D, 2-wide BVH, the six shard plane bits can refer to min_x, max_x, min_y, max_y, min_z, and max_z for the parent bounding box. If min_x bit is zero, the first child inherits the shared plane from the parent bounding box. For each child that shares a plane with the parent bounding box, quantized values for that plane need not be stored, which reduces the storage costs and the decompression costs for the node. Additionally, the higher precision value for the plane can be used for the child bounding box.

Figure 20:
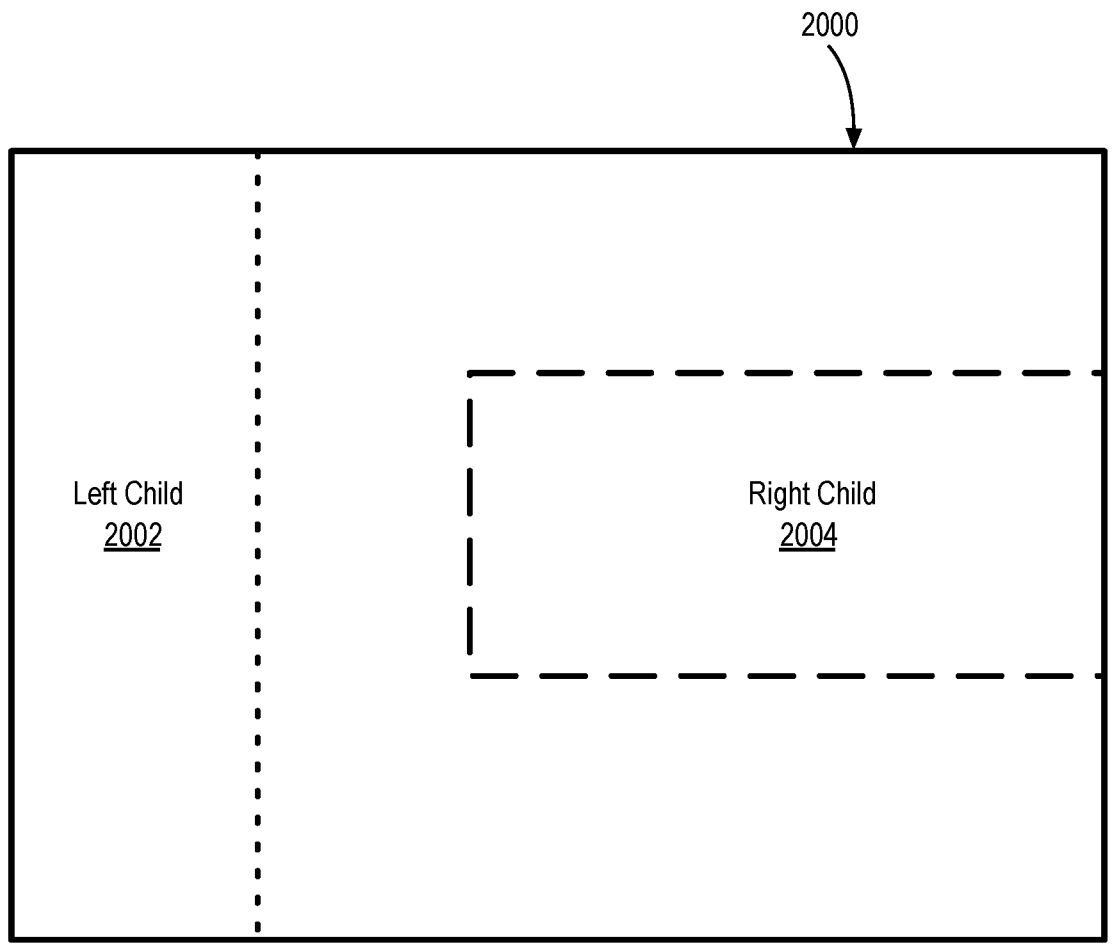
FIG. 20 is an illustration of an exemplary two-dimensional shared plane bounding box.

FIG. 20 is an illustration of an exemplary two-dimensional shared plane bounding box 2000. The two-dimensional (2D) shared plane bounding box (SPBB) 2000 includes a left child 2002 and a right child 2004. For a 2D binary SPBPP, 4 $\log_2$ 2 additional bits can be used to indicate which of the four shared planes of the parent bounding box are shared, where a bit is a associated with each plane. In one embodiment, a zero can be associated with the left child 2002 and a one can be associated with the right child, such that the shared plane bits for the SPBB 2000 are min_x=0; max_x=1; min_y=0; max_y=0, as the left child 2002 shares the lower_x, upper_y, and lower_y planes with the parent SPBB 2000 and the right child 2004 shares the upper_x plane.

Figure 21:
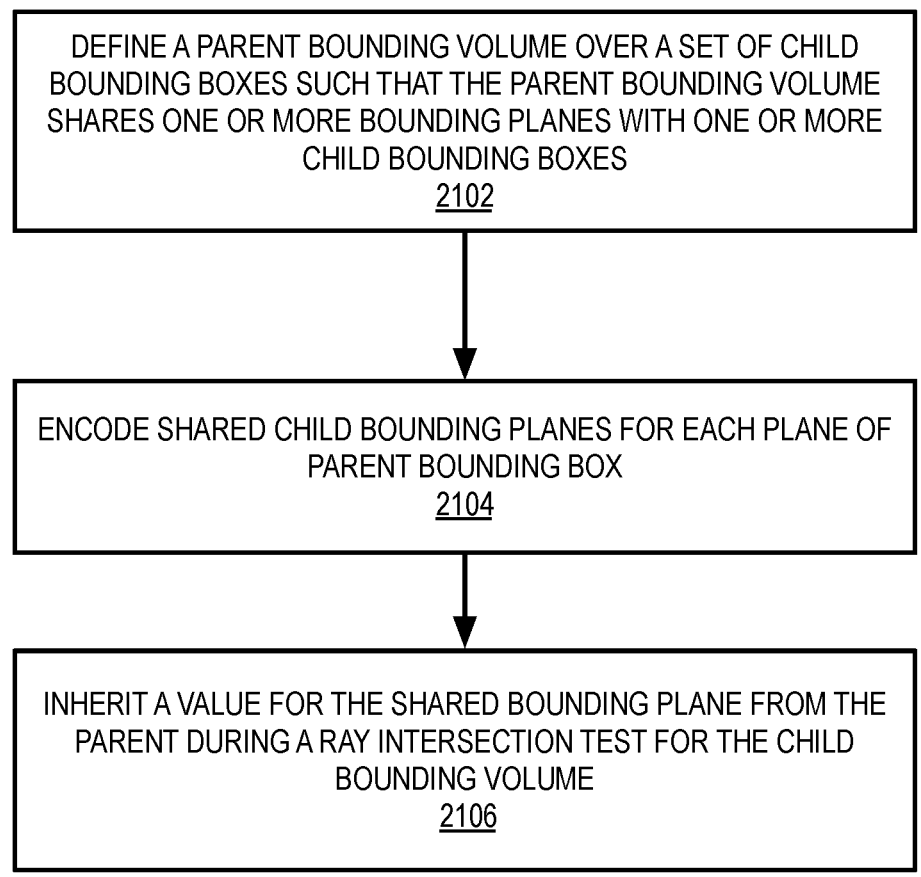
FIG. 21 is a flow diagram of shared plane BVH logic, according to an embodiment.

FIG. 21 is a flow diagram of shared plane BVH logic 2100, according to an embodiment. The shared plane BVH logic 2100 can be used to reduce the number of quantized values stored for the lower and upper extents of one or more child bounding boxes, reduce the decompression/dequantization costs for a BVH node, and enhance the precision of the values used for ray-box intersection tests for child bounding boxes of a BVH node. In one embodiment the shared plane BVH logic 2100 includes to define a parent bounding box over a set of child bounding boxes such that the parent bounding box shares one or more planes with one or more child bounding boxes, as shown at block 2102. The parent bounding box can be defined, in one embodiment, by selecting a set of existing axis aligned bounding boxes for geometric objects in a scene and defining a parent bounding box based on the minimum and maximum extent of the set of bounding boxes in each plane. For example, the upper plane value for each plane of the parent bounding box is defined as the maximum value for each plane within the set of child bounding boxes. At block 2104, the shared plane BVH logic 2100 can encode shared child planes for each plane of the parent bounding box. As shown at block 2106, the shared plane BVH logic 2100 can inherit a parent plane value for a child plane having a shared plane during a ray-box intersection test. The shared plane value for the child can be inherited at the higher precision in which the parent plane values are stored in the BVH node structure and generating and storing the lower precision quantized value for the shared plane can be bypassed.

Figure 22:
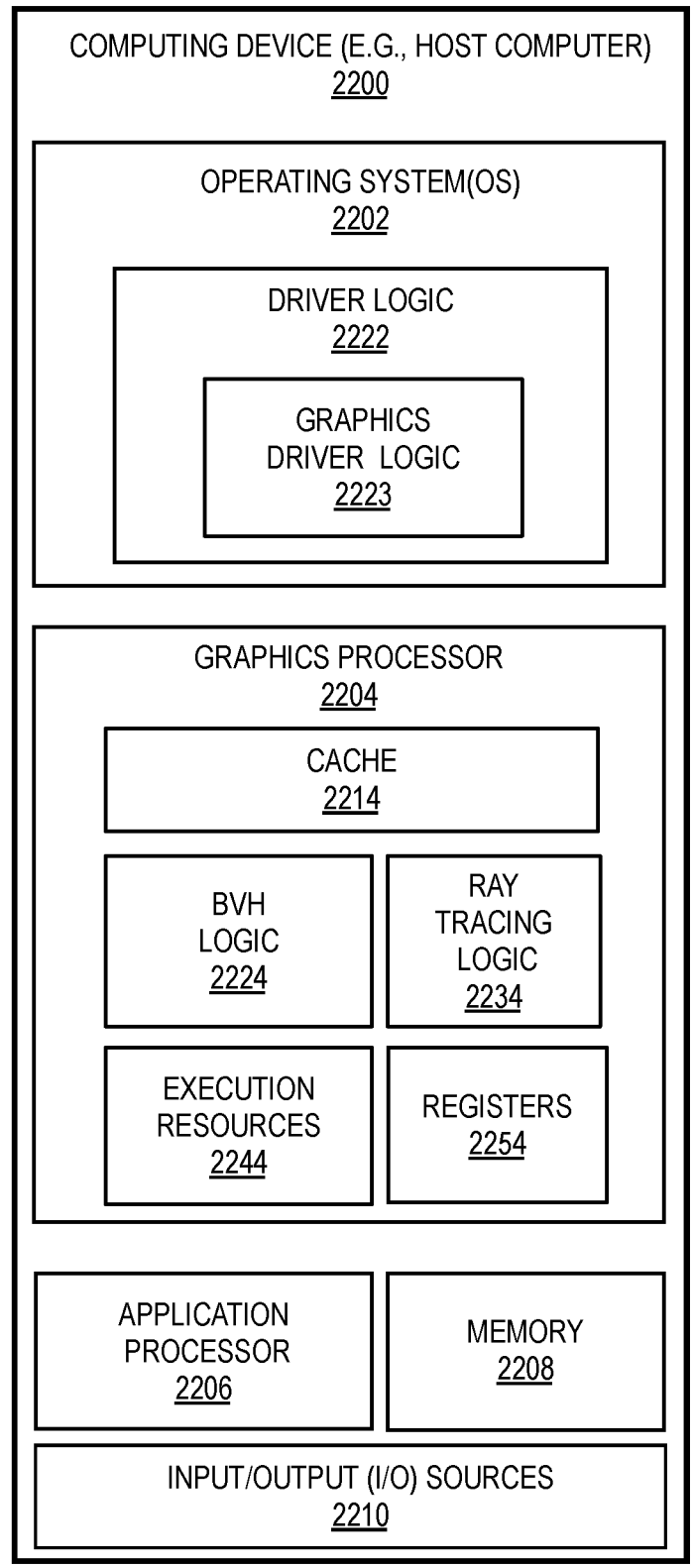
FIG. 22 is a block diagram of a computing device including a graphics processor having bounding volume hierarchy logic, according to an embodiment.

FIG. 22 is a block diagram of a computing device 2200 including a graphics processor 2204 having bounding volume hierarchy logic 2224, according to an embodiment. The computing device 2200 can be a computing device such as the data processing system 100 as in of FIG. 1. The computing device 2200 may also be or be included within a communication device such as a set-top box (e.g., Internet-based cable television set-top boxes, etc.), global positioning system (GPS)-based devices, etc. The computing device 2200 may also be or be included within mobile computing devices such as cellular phones, smartphones, personal digital assistants (PDAs), tablet computers, laptop computers, e-readers, smart televisions, television platforms, wearable devices (e.g., glasses, watches, bracelets, smartcards, jewelry, clothing items, etc.), media players, etc. For example, in one embodiment, the computing device 2200 includes a mobile computing device employing an integrated circuit ("IC"), such as system on a chip ("SoC" or "SOC"), integrating various hardware and/or software components of computing device 2200 on a single chip.

In one embodiment the bounding volume hierarchy (BVH) logic 2224 includes logic to encode a compressed representation of a bounding volume hierarchy and additional logic to decode and interpret the compressed representation of the bounding volume hierarchy. The BVH logic 2224 can work on concert with ray tracing logic 2234 to perform hardware accelerated ray-box intersection tests. In one embodiment the BVH logic 2224 is configured to encode multiple child bounding volumes relative to a reference bounding volume. For example, the BVH logic 2224 can encode the reference bounding volume and child bounding volumes using upper and lower bounds in multiple directions, where the reference bounding volume is encoded using floating point values and the child bounding volume is encoded using fixed point values. The BVH logic 2224 can be configured to encode the reference bounding volume as lower bounds and scaled extents of the bounds and the child bounding volumes using lower and upper bounds in multiple directions. In one embodiment the BVH logic 2224 is configured to use the encoded multiple child bounding volumes to encode nodes of a bounding volume hierarchy.

The ray tracing logic 2234 can operate at least in part in connection with execution resources 2244 of the graphics processor 2204 include execution units and associated logic, such as the logic within a graphics core 580A-N of FIG. 5 and/or the execution logic 600 illustrated in FIG. 6. The ray tracing logic 2234 can perform ray traversal through the bounding volume hierarchy and test if a ray intersects the encoded child bounding volumes of a node. The ray tracing logic 2234 can be configured to calculate bounding plane distances to test for ray bounding volume intersection by calculating distances to the planes of the lower reference bounding planes and adding to the distances the arithmetic product of the reciprocal ray direction, the scaled extents of the reference bounds, and the relative child bounding plane location, to calculate the distances to all child bounding planes.

In one embodiment a set of registers 2254 can also be included to store configuration and operational data for components of the graphics processor 2204. The graphics processor 2204 can additionally include a memory device configured as a cache 2214. In one embodiment the cache 2214 is a render cache for performing rendering operations. In one embodiment, the cache 2214 can also include an additional level of the memory hierarchy, such as a last level cache stored in the embedded memory module 218 of FIG. 2.

As illustrated, in one embodiment, in addition to a graphics processor 2204, the computing device 2200 may further include any number and type of hardware components and/or software components, such as (but not limited to) an application processor 2206, memory 2208, and input/output (I/O) sources 2210. The application processor 2206 can interact with a hardware graphics pipeline, as illustrated with reference to FIG. 3, to share graphics pipeline functionality. Processed data is stored in a buffer in the hardware graphics pipeline, and state information is stored in memory 2208. The resulting image is then transferred to a display controller for output via a display device, such as the display device 320 of FIG. 3. The display device may be of various types, such as Cathode Ray Tube (CRT), Thin Film Transistor (TFT), Liquid Crystal Display (LCD), Organic Light Emitting Diode (OLED) array, etc., and may be configured to display information to a user.

The application processor 2206 can include one or more processors, such as processor(s) 102 of FIG. 1, and may be the central processing unit (CPU) that is used at least in part to execute an operating system (OS) 2202 for the computing device 2200. The OS 2202 can serve as an interface between hardware and/or physical resources of the computer device 2200 and a user. The OS 2202 can include driver logic 2222 for various hardware devices in the computing device 2200. The driver logic 2222 can include graphics driver logic 2223 such as the user mode graphics driver 1026 and/or kernel mode graphics driver 1029 of FIG. 10. In one embodiment the graphics driver logic 2223 can be used to configure the BVH logic 2224 and ray tracing logic 2234 of the graphics processor 2204.

It is contemplated that in some embodiments, the graphics processor 2204 may exist as part of the application processor 2206 (such as part of a physical CPU package) in which case, at least a portion of the memory 2208 may be shared by the application processor 2206 and graphics processor 2204, although at least a portion of the memory 2208 may be exclusive to the graphics processor 2204, or the graphics processor 2204 may have a separate store of memory. The memory 2208 may comprise a pre-allocated region of a buffer (e.g., framebuffer); however, it should be understood by one of ordinary skill in the art that the embodiments are not so limited, and that any memory accessible to the lower graphics pipeline may be used. The memory 2208 may include various forms of random access memory (RAM) (e.g., SDRAM, SRAM, etc.) comprising an application that makes use of the graphics processor 2204 to render a desktop or 3D graphics scene. A memory controller hub, such as memory controller hub 116 of FIG. 1, may access data in the memory 2208 and forward it to graphics processor 2204 for graphics pipeline processing. The memory 2208 may be made available to other components within the computing device 2200. For example, any data (e.g., input graphics data) received from various I/O sources 2210 of the computing device 2200 can be temporarily queued into memory 2208 prior to their being operated upon by one or more processor(s) (e.g., application processor 2206) in the implementation of a software program or application. Similarly, data that a software program determines should be sent from the computing device 2200 to an outside entity through one of the computing system interfaces, or stored into an internal storage element, is often temporarily queued in memory 2208 prior to its being transmitted or stored.

The I/O sources can include devices such as touchscreens, touch panels, touch pads, virtual or regular keyboards, virtual or regular mice, ports, connectors, network devices, or the like, and can attach via an input/output (I/O) control hub (ICH) 130 as referenced in FIG. 1. Additionally, the I/O sources 2010 may include one or more I/O devices that are implemented for transferring data to and/or from the computing device 2200 (e.g., a networking adapter); or, for a large-scale non-volatile storage within the computing device 2200 (e.g., hard disk drive). User input devices, including alphanumeric and other keys, may be used to communicate information and command selections to graphics processor 2204. Another type of user input device is cursor control, such as a mouse, a trackball, a touchscreen, a touchpad, or cursor direction keys to communicate direction information and command selections to GPU and to control cursor movement on the display device. Camera and microphone arrays of the computer device 2200 may be employed to observe gestures, record audio and video and to receive and transmit visual and audio commands.

I/O sources 2210 configured as network interfaces can provide access to a network, such as a LAN, a wide area network (WAN), a metropolitan area network (MAN), a personal area network (PAN), Bluetooth, a cloud network, a cellular or mobile network (e.g., $3^{rd}$ Generation (3G), $4^{th}$ Generation (4G), etc.), an intranet, the Internet, etc. Network interface(s) may include, for example, a wireless network interface having one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Network interface(s) may provide access to a LAN, for example, by conforming to IEEE 802.11 standards, and/or the wireless network interface may provide access to a personal area network, for example, by conforming to Bluetooth standards. Other wireless network interfaces and/or protocols, including previous and subsequent versions of the standards, may also be supported. In addition to, or instead of, communication via the wireless LAN standards, network interface(s) may provide wireless communication using, for example, Time Division, Multiple Access (TDMA) protocols, Global Systems for Mobile Communications (GSM) protocols, Code Division, Multiple Access (CDMA) protocols, and/or any other type of wireless communications protocols.

It is to be appreciated that a lesser or more equipped system than the example described above may be preferred for certain implementations. Therefore, the configuration of the computing device 2200 may vary from implementation to implementation depending upon numerous factors, such as price constraints, performance requirements, technological improvements, or other circumstances. Examples include (without limitation) a mobile device, a personal digital assistant, a mobile computing device, a smartphone, a cellular telephone, a handset, a one-way pager, a two-way pager, a messaging device, a computer, a personal computer (PC), a desktop computer, a laptop computer, a notebook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combinations thereof.

Embodiments may be implemented as any one or a combination of: one or more microchips or integrated circuits interconnected using a parent-board, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

The following clauses and/or examples pertain to specific embodiments or examples thereof. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to performs acts of the method, or of an apparatus or system according to embodiments and examples described herein. Various components can be a means for performing the operations or functions described.

One embodiment provides for a graphics processing apparatus comprising a graphics processing unit including bounding volume logic to encode a first bounding volume and at least second bounding volume for a node of a bounding volume hierarchy, wherein the first bounding volume is to be encoded at a higher numerical precision relative to the second bounding volume. In one embodiment the graphics processing apparatus additionally includes additionally includes ray tracing logic to perform a ray intersection test for the second bounding volume.

One embodiment provides for a system on a chip integrated circuit including an application processor and a graphics processor, the integrated circuit comprising bounding volume logic to encode a first bounding volume and a second bounding volume for a bounding volume hierarchy, where the first bounding volume is to be encoded at a higher numerical precision relative to the second bounding volume and the second bounding volume is to be encoded based on a first bounding plane of the first bounding volume; and ray tracing logic to perform a ray intersection test for the second bounding, where, to perform the ray intersection test, the ray tracing logic is to decode a set of planar boundaries for the second bounding volume based in part on the first bounding plane.

One embodiment provides for a graphics processing system comprising an application processor coupled to a graphics processor, wherein the application processor and the graphics processor are to perform processing operations including calculating a distance to a first bounding plane of a parent bounding volume of a bounding volume hierarchy; calculating the distance to a lower bounding plane of a child bounding volume based in part on the distance to the lower bounding plane of the parent bounding volume; calculating the distance to an upper bounding plane of the child bounding volume based in part on the distance to the lower bounding plane of the parent bounding volume; and determining a ray intersection for the child bounding volume based in part on the distance to the upper and lower bounding plane of the child bounding volume.

One embodiment provides for a graphics processing apparatus comprising a graphics processing unit including bounding volume logic to decode a node of a compressed bounding volume hierarchy, wherein the node includes a parent (e.g., reference) bounding volume and multiple child bounding volumes encoded relative to the reference bounding volume. In a further embodiment the bounding volume logic is to determine from the node of the compressed bounding volume hierarchy whether one or more of the lower or upper bounding values of at least one child bounding volumes are equal to one or more of the parent bounding values. In a further embodiment, the graphic processing apparatus additionally comprises logic to encode the parent bounding volume as floating point data and the at least one child bounding volume as fixed point data, wherein the parent bounding volume is encoded as lower bounds and scaled extents of planar bounding planes of the parent bounding volume, the scaled extents encoded as a power of 2 exponent.

In a further embodiment the graphics processing apparatus additionally includes ray tracing logic to perform ray traversal through the compressed bounding volume hierarchy via a ray bounding volume intersection test with the at least one child bounding volume. The ray tracing logic can calculate the bounding plane distances to test for ray bounding volume intersection via logic configured to calculate distance to a parent lower bounding plane and add a product of a reciprocal ray direction, a power of 2 scaled extent, and a fixed point relative child bounding value to the distance to a planar bounding plane of the at least one child bounding volume. In one embodiment the processing operations additionally include performing a ray intersection test to determine the ray intersection for the child bounding volume. During the ray intersection test, at least one of the upper or lower bounding plane of the child bounding plane can be a shared bounding plane.

Other embodiments provide for methods or non-transitory mediums storing instructions to cause systems and/or devices to perform the methods and/or operations described herein. In one embodiment, a non-transitory machine readable medium stores a data which, when read by one or more machines, causes the one or more machines to fabricate a system on a chip integrated circuit to perform a process to perform a bounding volume intersection test on a graphics processor as described herein. One embodiment provides for a system comprising means for performing a method or process as described herein.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

What is claimed is:

1. A graphics processing apparatus comprising a graphics processing unit including bounding volume logic to encode multiple child bounding volumes each having values encoded as an offset relative to a reference bounding volume, in a compressed bounding value hierarchy, the offset for each child bounding volume to be encoded and stored with lower precision than the reference bounding volume.

2. The graphics processing apparatus as in claim 1, wherein the bounding volume logic is configured to encode the reference bounding volume and child bounding volumes using lower and upper bounds in multiple directions.

3. The graphics processing apparatus as in claim 2, wherein the bounding volume logic is additionally configured to encode the reference bounding volume using floating point values and the child bounding volume using fixed point values.

4. The graphics processing apparatus as in claim 1, wherein the bounding logic is additionally configured to encode the reference bounding volume as lower bounds and scaled extents of the bounds and the child bounding volumes using lower and upper bounds in multiple directions.

5. The graphics processing apparatus as in claim 4, wherein the bounding logic is additionally configured to encode the lower bounds of the reference bounding volume and scaled extents using floating point values and the relative child bounding volume using fixed point values.

6. The graphics processing apparatus as in claim 4, wherein the reference bounding logic is additionally configured to encode lower bounds of the reference bounding volume using floating point values, the scaled extent as a power of 2, and the child bounding volume using fixed point values.

7. The graphics processing apparatus as in claim 1, wherein each reference bounding plane stores an index of an equal child bounding plane without storing the equal child bounding plane.

8. The graphics processing apparatus as in claim 7, wherein the bounding volume logic is additionally configured to use the encoded multiple child bounding volumes to encode nodes of a bounding volume hierarchy.

9. The graphics processing apparatus as in claim 8 additionally including ray tracing logic to perform ray traversal through the bounding volume hierarchy, the ray tracing logic to test if a ray intersects the encoded child bounding volumes of a node.

10. The graphics processing apparatus as in claim 9, wherein the ray tracing logic is additionally configured to calculate bounding plane distances to test for ray bounding volume intersection via logic configured to:
   calculate distances to the planes of the lower reference bounding planes; and
   add to the distances a product of a reciprocal ray direction, scaled extents of the reference bounds, and the relative child bounding plane location, to calculate the distances to all child bounding planes.

11. A system on a chip integrated circuit including an application processor and a graphics processor, the integrated circuit comprising:
   bounding volume logic to encode, in a compressed bounding value hierarchy, multiple child bounding volumes each with values encoded and stored with lower precision as an offset relative to a reference bounding volume encoded and stored with higher precision; and
   ray tracing logic to perform ray traversal through a bounding volume hierarchy, the ray tracing logic to test if a ray intersects the encoded child bounding volumes of a node.

12. The system on a chip integrated circuit as in claim 11, wherein the bounding logic is additionally configured to encode the reference bounding volume and child bounding volumes using lower and upper bounds in multiple directions.

13. The system on a chip integrated circuit as in claim 12, wherein the bounding volume logic is additionally configured to encode the reference bounding volume using floating point values and the child bounding volume using fixed point values.

14. The system on a chip integrated circuit as in claim 11, wherein the bounding logic is additionally configured to encode the reference bounding volume as lower bounds and scaled extents of the bounds and the child bounding volumes using lower and upper bounds in multiple directions.

15. The system on a chip integrated circuit as in claim 11, wherein the ray tracing logic is additionally configured to calculate bounding plane distances to test for ray bounding volume intersection via logic configured to:
   calculate distances to the planes of the lower reference bounding planes; and
   add to the distances a product of a reciprocal ray direction, scaled extents of the reference bounds, and the relative child bounding plane location, to calculate the distances to all child bounding planes.

16. A graphics processing system comprising:
   an application processor coupled to a graphics processor, wherein the application processor and the graphics processor are to perform processing operations including:
   calculating a distance for a ray to a first bounding plane of a reference bounding volume of a bounding volume hierarchy;
   calculating a distance for the ray to a lower bounding plane of a child bounding volume based in part on the calculated distance to the first bounding plane of the reference bounding volume;
   calculating a distance for the ray to an upper bounding plane of the child bounding volume based in part on the calculated distance to the first bounding plane of the reference bounding volume, wherein the calculating the distances to the lower and upper bounding planes of the child bounding volume is based on the child bounding volume having values encoded and stored with lower precision as an offset relative to the reference bounding volume, which is encoded and stored with higher precision in the bounding volume hierarchy; and
   determining a ray intersection for the child bounding volume based in part on the distance to the upper and lower bounding plane of the child bounding volume.

17. The graphics processing system as in claim 16, wherein the processing operations additionally include:
   defining the reference bounding volume based in part on a bounding plane of the child bounding volume such that the reference bounding volume includes a shared bounding plane that is shared with the child bounding volume; and
   encoding a value indicating that the shared bounding plane is associated with the child bounding volume.

18. The graphics processing system as in claim 17, wherein the child bounding volume includes at least a first bounding plane and a second bounding plane, the first bounding plane is stored as a fixed point value and the second bounding plane is the shared bounding plane, wherein the shared bounding plane is not stored.

19. The graphics processing system as in claim 18, wherein the processing operations additionally include performing a ray intersection test to determine the ray intersection for the child bounding volume.

20. The graphics processing system as in claim 19, wherein during the ray intersection test, at least one of the upper or lower bounding planes of the child bounding volume is a shared bounding plane.

* * * * *